(12) United States Patent
Kerr

(10) Patent No.: US 10,208,731 B2
(45) Date of Patent: Feb. 19, 2019

(54) FLUTTER OSCILLATION HYDROFOIL SYSTEM UTILIZING A HYDRAULIC POWER CIRCUIT TO EFFICIENTLY TRANSMIT HARVESTED ENERGY

(71) Applicant: RESHYDRO LLC, Milan, NY (US)

(72) Inventor: Colin Kerr, Dartmouth (CA)

(73) Assignee: ResHydro LLC, Milan, NY (US)

( * ) Notice: Subject to any disclaimer, the term of this patent is extended or adjusted under 35 U.S.C. 154(b) by 58 days.

(21) Appl. No.: 15/577,644

(22) PCT Filed: Dec. 2, 2015

(86) PCT No.: PCT/US2015/063548
§ 371 (c)(1),
(2) Date: Nov. 28, 2017

(87) PCT Pub. No.: WO2016/090057
PCT Pub. Date: Jun. 9, 2016

(65) Prior Publication Data
US 2018/0163693 A1 Jun. 14, 2018

Related U.S. Application Data

(60) Provisional application No. 62/086,704, filed on Dec. 2, 2014.

(51) Int. Cl.
*F03B 17/06* (2006.01)
*F03D 9/17* (2016.01)
*F03D 5/06* (2006.01)

(52) U.S. Cl.
CPC .............. *F03B 17/06* (2013.01); *F03D 5/06* (2013.01); *F03D 9/17* (2016.05); *F05B 2240/12* (2013.01);
(Continued)

(58) Field of Classification Search
CPC .... F03B 17/06; F03D 5/06; F03D 9/17; F05B 2240/12; F05B 2240/124; F05B 2240/40;
(Continued)

(56) References Cited

U.S. PATENT DOCUMENTS 1,486,040 A 3/1924 Schieferstein
2,783,022 A 2/1957 Salzer
(Continued)

FOREIGN PATENT DOCUMENTS

WO 2006130719 A2 12/2006

OTHER PUBLICATIONS

International Search Report and Written Opinion issued in International Application No. PCT/US15/63548 dated Mar. 29, 2016, 12 pages.

*Primary Examiner* — Abdullah Riyami
*Assistant Examiner* — S. Mikailoff
(74) *Attorney, Agent, or Firm* — Mauriel Kapouytian Woods LLP; Michael Mauriel

(57) ABSTRACT

Various embodiments of an apparatus and method for extracting useful work from a fluid stream are disclosed. Some embodiments comprise balanced hydrofoils comprising upper and lower semifoils joined by a member. Some embodiments comprise an array of removable hydrofoil modules wherein each module is adapted to provide an independent power contribution to an overall system, depending on speed of the fluid stream in the vicinity of the module, and each module is further adapted to provide its power contribution at a substantially consistent pressure to an array-wide high pressure fluid circuit. These and other embodiments are further disclosed herein.

18 Claims, 23 Drawing Sheets

(52) U.S. Cl.
CPC ..... *F05B 2240/124* (2013.01); *F05B 2240/40* (2013.01); *F05B 2250/42* (2013.01); *F05B 2260/406* (2013.01); *Y02E 10/28* (2013.01)

(58) Field of Classification Search
CPC . F05B 2250/42; F05B 2260/406; Y02E 10/28
See application file for complete search history.

(56) References Cited

U.S. PATENT DOCUMENTS

| | | | |
|---|---|---|---|
| 3,040,976 A | 6/1962 | De Mattos | |
| 3,508,840 A | 4/1970 | Lederlin | |
| 3,783,858 A | 1/1974 | Ashikian | |
| 3,883,750 A | 5/1975 | Uzzell, Jr. | |
| 3,995,972 A * | 12/1976 | Nassar | F03D 5/06 416/68 |
| 4,024,409 A | 5/1977 | Payne | |
| 4,170,738 A | 10/1979 | Smith | |
| 4,184,805 A | 1/1980 | Arnold | |
| 4,255,085 A | 3/1981 | Evans | |
| 4,347,036 A | 8/1982 | Arnold | |
| 4,362,469 A | 12/1982 | van Holten | |
| 4,915,584 A * | 4/1990 | Kashubara | F03D 5/06 416/64 |
| 5,457,346 A | 10/1995 | Blumberg et al. | |
| 6,273,680 B1 | 8/2001 | Arnold | |
| 6,323,563 B1 * | 11/2001 | Kallenberg, Jr. | F03B 17/067 290/42 |
| 6,731,018 B1 | 5/2004 | Grinsted et al. | |
| 6,877,692 B2 | 4/2005 | Liu | |
| 7,632,069 B2 * | 12/2009 | Kelley | F03B 17/06 416/80 |
| 7,905,705 B2 * | 3/2011 | Kelley | F03B 17/06 416/80 |
| 8,469,663 B2 * | 6/2013 | Kerr | F03B 17/062 416/1 |
| 9,291,147 B2 * | 3/2016 | Jones | F03B 17/06 |
| 9,562,434 B2 * | 2/2017 | Liu | F03B 13/264 |
| 2010/0019504 A1 * | 1/2010 | Kelley | F03B 17/06 290/55 |
| 2010/0143115 A1 * | 6/2010 | Kerr | F03B 17/062 416/1 |
| 2010/0295302 A1 | 11/2010 | Martin | |
| 2011/0030361 A1 * | 2/2011 | Gopalswamy | F03D 5/06 60/398 |
| 2011/0293426 A1 | 12/2011 | Fucks et al. | |
| 2012/0235417 A1 | 9/2012 | Arntz | |
| 2013/0099502 A1 * | 4/2013 | Roberts | F03B 13/08 290/54 |
| 2014/0097621 A1 * | 4/2014 | Kassianoff | B63H 1/36 290/55 |
| 2018/0163693 A1 * | 6/2018 | Kerr | F03B 17/06 |

\* cited by examiner

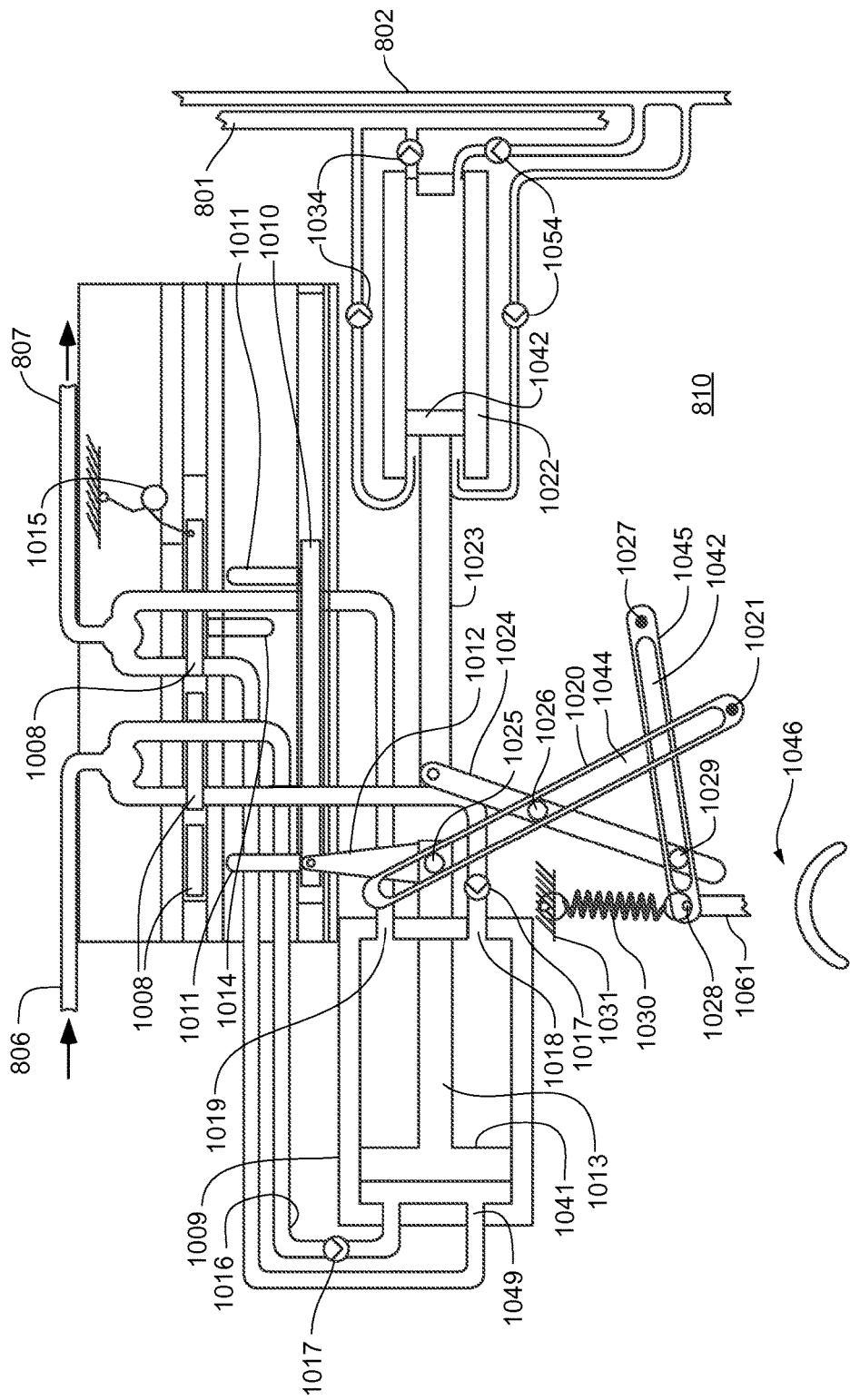

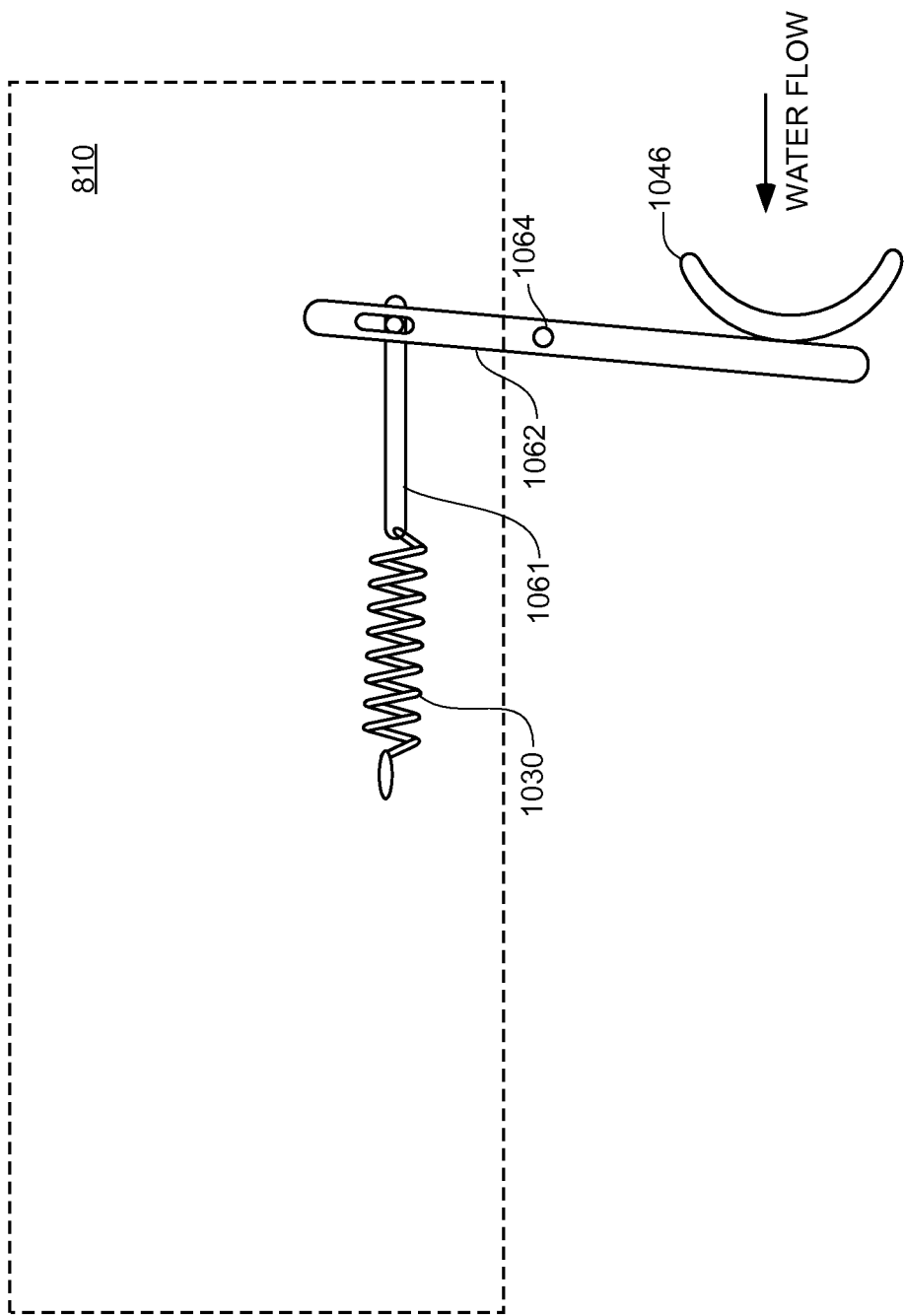

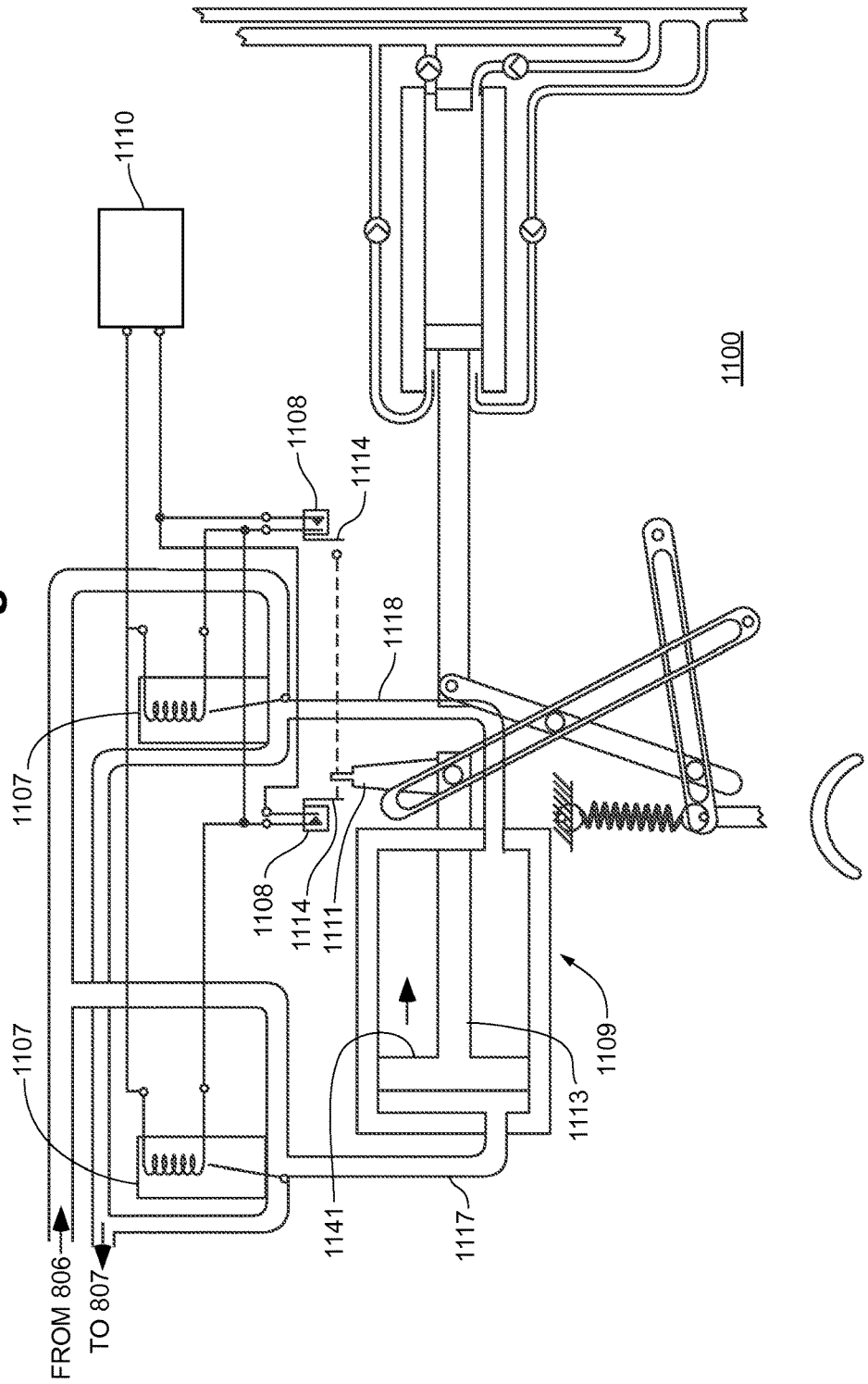

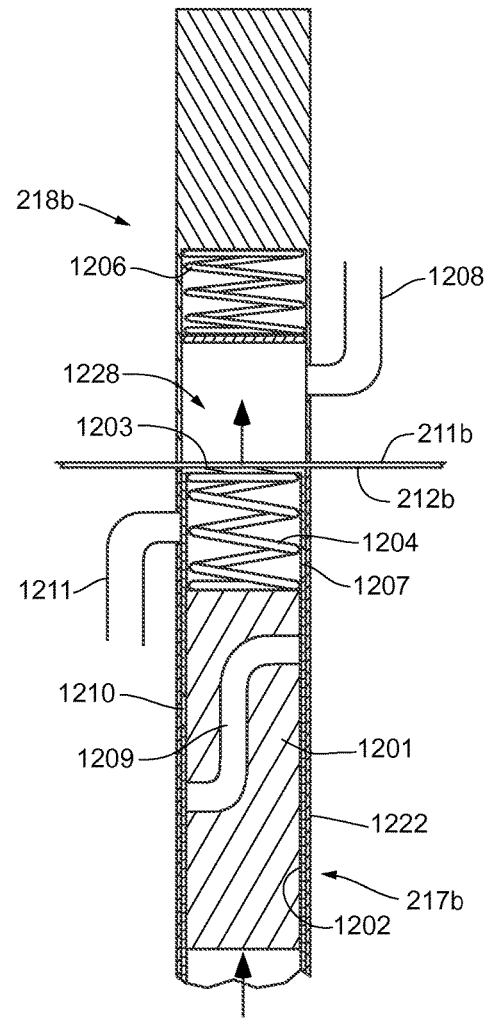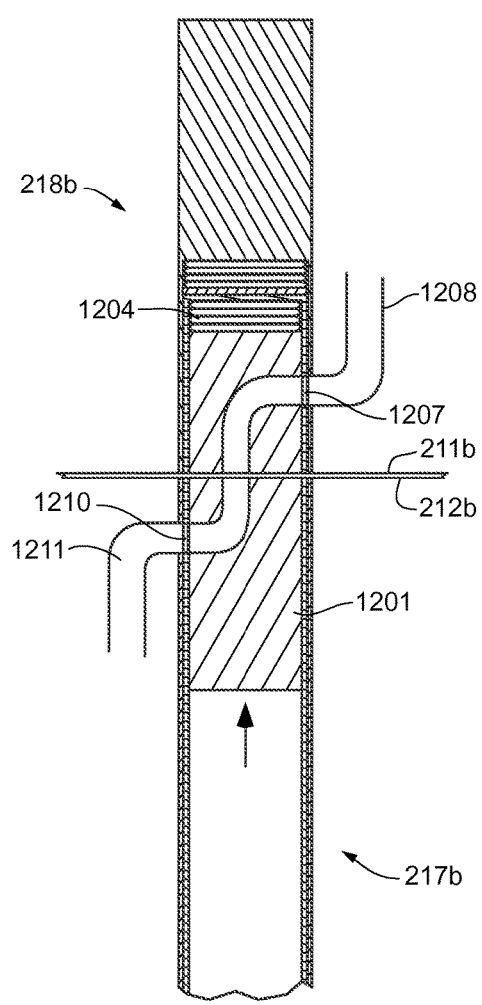

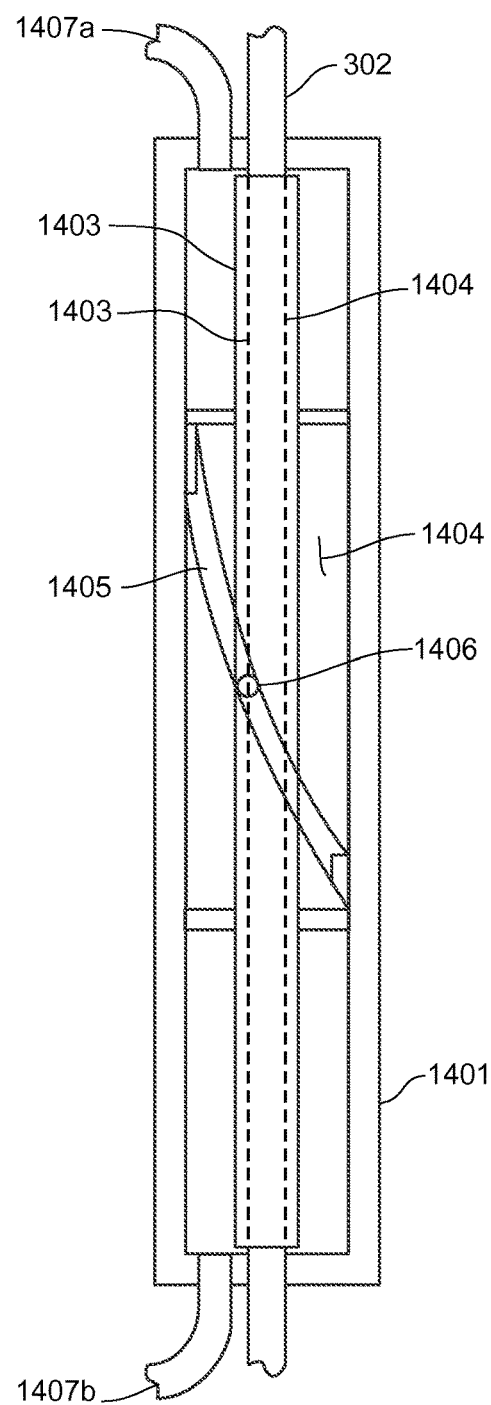
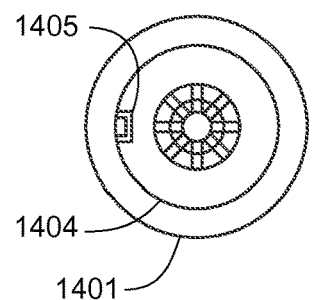
Fig. 14A
Fig. 14B

FLUTTER OSCILLATION HYDROFOIL SYSTEM UTILIZING A HYDRAULIC POWER CIRCUIT TO EFFICIENTLY TRANSMIT HARVESTED ENERGY

CROSS-REFERENCE TO RELATED APPLICATIONS

This application is a U.S. National Phase application under 35 USC § 371 of International Application No. PCT/US2015/063548 filed Dec. 2, 2015which claims the benefit of U.S. Provisional Application Ser. No. 62/086,704. The entire disclosure of these applications are hereby incorporated herein by reference.

TECHNICAL FIELD AND BACKGROUND OF THE INVENTION

Hydro-electric power systems have suffered from many deficiencies. These deficiencies have included inefficient power output and significant disruption to the natural environment. Systems that rely on a row of adjacent hydrofoils that achieve flutter oscillation have shown promise for addressing both deficiencies. These principles and specific systems implementing them are shown, for example, in U.S. Pat. No. 4,347,036 (Arnold), U.S. Pat. No. 6,273,680 (Arnold) and U.S. Pat. No. 8,469,663 (Kerr).

SUMMARY

Various challenges have remained to effectively implementing an oscillating hydrofoil system for extracting energy from water.

One challenge is that the foils need to be held parallel to each other and perpendicular to the expected flow direction of a fluid stream. When there are bending forces on the foils, the resulting structural strain on the foils and their mounting structures can wear out the system's physical components too quickly. Therefore, one embodiment of the present invention provides a system using balanced hydrofoils comprising an upper and lower semifoil joined by a member. In one aspect, such an embodiment can help reduce the net torque imposed on a hydrofoil that is held perpendicular to the flow direction of a fluid stream.

Another challenge is that the flow rate may vary considerably over a cross section of a fluid stream (e.g., tidal waters, rivers, etc.) in which an array of foils may operate. If all the foils in an entire array are mechanically linked, then foils located in a non-moving or slowly moving flow region can become a load with respect to foils located in a fast flow region. Moreover, mechanical linking of all the foils in an array can require that the entire system be shut down in order to replace foils or associated structural, power or control components. Therefore, in one embodiment of the present invention, a system comprises several modules, each module preferably comprising an even number of adjacent hydrofoils mounted for translational and rotational oscillation. In one embodiment, each module comprises two adjacent hydrofoils. In a preferred embodiment, each module preferably comprises not more than four adjacent hydrofoils. However, in alternative embodiments, a module may comprise a greater number of foils without necessarily departing from the spirit and scope of the present invention. Each module is provided within a module frame that is adapted for insertion into a cell of an array frame. With the modules inserted, an array of modules (which may be one dimensional, e.g., a row; or two-dimensional, e.g., multiple rows stacked on top of each other) is formed, with each module's foils free to oscillate at a power output reflecting the kinetic energy of the fluid stream in the vicinity of that module.

To efficiently transmit harvested energy from the fluid stream, it is desirable to direct the energy out of the fluid stream on a single hydraulic transmission line operating at a given fluid pressure. Therefore, one embodiment of the present invention provides an array-wide high pressure fluid circuit that delivers energy to a master accumulator via a high pressure hydraulic transmission line. However, because of the above-referenced variation of water flow rate, different modules will, at a given time, be contributing different amounts of energy for conversion to fluid pressure. Therefore, an embodiment of the present invention provides for local hydraulic power circuits within each module that operate independently of each other at varying module-specific pressures and that are effectively decoupled from each other and from a pressure level of an array-wide hydraulic power transmission circuit.

In one embodiment of the invention, these local hydraulic circuits comprise one or more power mechanisms coupled to convert translational movement of the module's hydrofoils into hydraulic pressure, a low pressure cylinder within a module decoupler unit, and conduit for conveying hydraulic pressure between the two. In an embodiment of the present invention, the decoupler unit responds to hydraulic pressure received via the local hydraulic circuit and, to the extent necessary, converts that pressure to higher pressure output to the array-wide high pressure circuit. In a particular embodiment, the decoupler unit includes a water speed sensor responsive to the flow speed of the fluid stream and also includes a variable leverage mechanism that, based on the speed of the fluid stream at the module, dynamically adjusts a mechanical leverage relationship between a first hydraulic piston coupled to the local hydraulic circuit and a second hydraulic piston coupled to the array-wide high pressure hydraulic circuit.

In another embodiment, local hydraulic circuits comprise an adjustable translational transducer for converting translational movement of a module's hydrofoils into hydraulic pressure. In an embodiment, the translational transducer includes an assembly of hydraulic sub-cylinders of different cylinder diameters that are used to match a determined amount of hydrofoil motion to a uniform pressure of a high pressure line. In an embodiment, this adjustable translational transducer allows a module to provide uniform high pressure output to an array-wide high pressure line despite local variations in water speed without the need for the module-specific low pressure circuit and corresponding module power decoupler of other embodiments described herein. In an embodiment, each of the assembly of hydraulic sub-cylinders includes a selector valve such that a particular combination of sub-cylinders may be selectably connected to the high-pressure line based on the speed of the water traversing the module at any moment. In an embodiment, a selector valve controller takes into account water speed at the module, as measured by a water flow sensor, to determine a power increment that matches the power absorption capability of the module to the manifold pressure, and selects one or more sub-cylinders or combinations of sub-cylinders in the assembly for connection to the high pressure manifold.

These and other embodiments are more fully described below.

BRIEF DESCRIPTION OF THE DRAWINGS

The novel features of the invention are set forth in the appended claims. However, for purpose of explanation, several aspects of a particular embodiment of the invention are described by reference to the following figures.

FIG. 10a illustrates details of a first embodiment in accordance with the present invention of the module decoupler of FIG. 8.

FIG. 10b illustrates a side view of a portion of the embodiment of FIG. 10a.

FIG. 11 illustrates details of an alternative embodiment in accordance with the present invention of a module decoupler.

FIGS. 12A-12B are schematic diagrams illustrating the operation of the module-to-array interface units of FIGS. 2A-2B, the interface units being in accordance with an embodiment of the present invention.

FIGS. 14A and 14B illustrate side (FIG. 14A) and top (FIG. 14B) views of an embodiment in accordance with the present invention for a rotational transducer that is an alternative to the rotational transducer of FIG. 4.

DETAILED DESCRIPTION

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
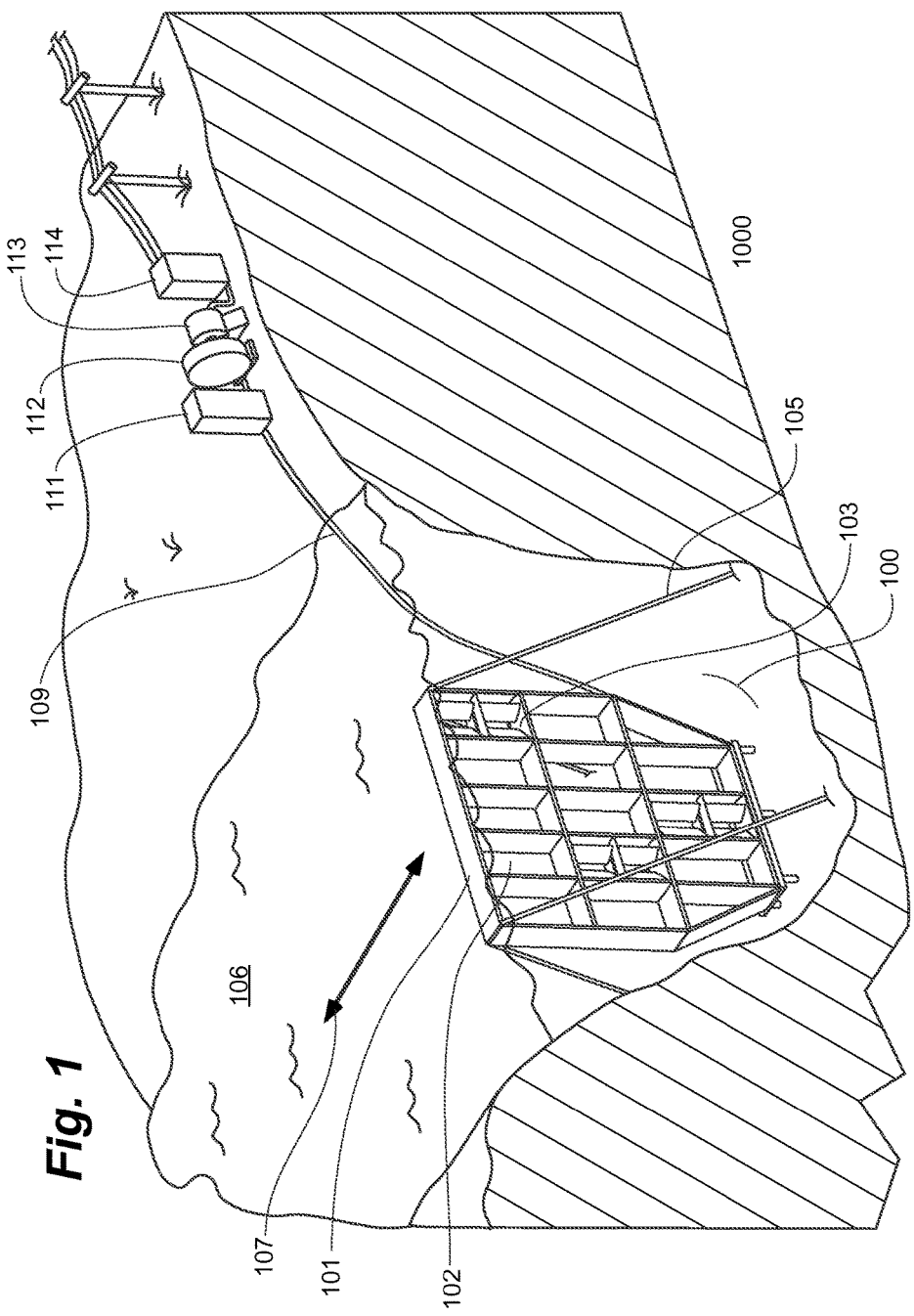
FIG. 1 illustrates a hydroelectric power system including a modular water energy conversion system, the modular water energy conversion system being in accordance with an embodiment of the present invention.

FIG. 1 illustrates a hydroelectric power system 1000. System 1000 includes a modular water energy conversion system 100 adapted to be placed in a body of water 106 that flows in either or both directions 107 through system 100. In this example, body of water 106 is a river channel. However, the described system can be adapted for use with other bodies of water in which the water is expected to flow through system 100. For example, it can be used effectively in tidal waters. In general, system 100 is adapted to harvest the kinetic energy of a fluid stream.

In the illustrated embodiment, system 100 includes an array frame 101 that is placed near the bottom of water channel 106 and is stabilized by cables 105. Array frame 101 includes horizontal and vertical elements (which are described further in the context of other figures) that define an array of cells 102. Each cell 102 is adapted to receive an independent water energy conversion module 103. As will be further described in the context of other figures, modules 103 each include two balanced foils mounted within the module 103 for two degrees of freedom such that the balanced foil can oscillate within a range of lateral and within a range of rotational motion. The balanced foils oscillate in response to force imparted by the flowing water of river channel 106. The lateral movement of the foils is converted to fluid pressure in each module which is delivered through conduits housed within each module 103 to conduits housed within the structure of array frame 101 which in turn delivers the resulting fluid pressure through high pressure conduit 109. High pressure conduit 109 is coupled to master accumulator 111. Additional above-ground components include hydraulic motor 112, synchronous alternator 113, and additional systems 114 which include synchronizing and power conditioning equipment for interfacing with utility power lines. Control and monitoring systems (not separately shown) may also be housed above ground and be electronically and/or fluidically coupled to system 100.

In one embodiment, system 100 is designed such that one or more modules 103 can be removed from a corresponding cell 102 of array frame 101 and the remaining modules 103 can still operate to provide water energy conversion to deliver fluid pressure through high pressure conduit 109 to master accumulator 111. For example, in the illustrated array, three of the illustrated cells 102 have modules 103 installed and the remaining cells 102 are empty. However, the drawing is only intended to illustrate this principle in a general sense; preferably for efficient operation, fewer cells would be empty. Preferably, the arrangement simply allows removal of one or more modules (e.g., for repair purposes) without affecting the ability of the remaining modules to continue contributing to the system's overall power production.

The modular design of system 100 also allows flexibility in shaping the module array frame. For example, in the illustrated embodiment, the upper two rows of the array have five modules and the lowest row has three modules. In this example, the array is shaped in view of the shape of the bottom of river channel 106.

It should be noted that FIG. 1 is not drawn to scale. In other words, the drawing does not attempt to depict the relative sizes of elements and the environment in which they are placed. To cite but one example, in a preferred implementation, array frame 101 is placed on the bottom of channel that is significantly deeper than the height of the array frame. For example, in one preferred implementation, a channel depth in the vicinity of array frame 101 is more than twice the height of array frame 101.

Figure 2A:
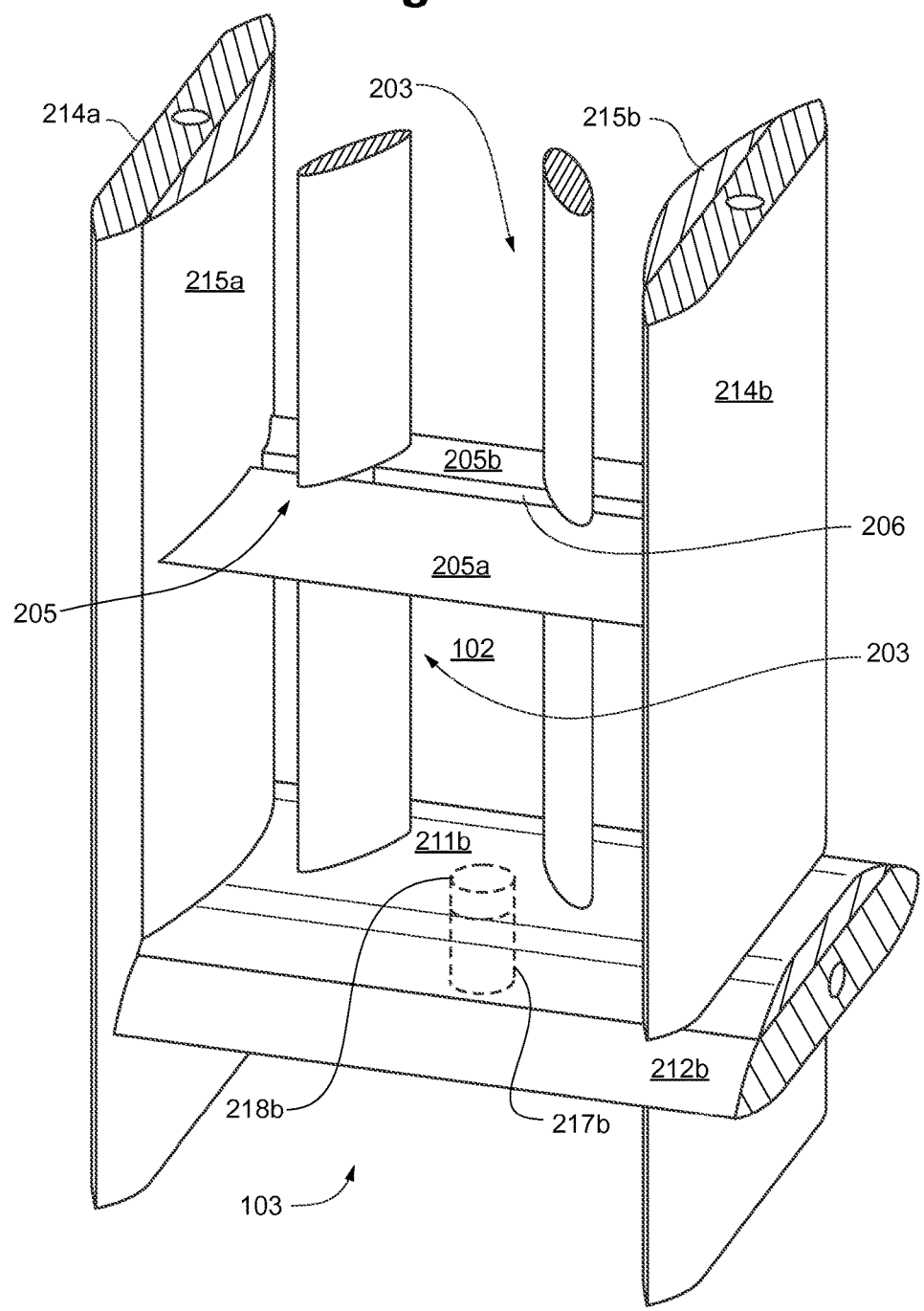
FIGS. 2A and 2B are different perspective views of a portion of the water energy conversion system of FIG. 1 including a balanced foil module comprising two balanced foils within module frame and within a cell of the array frame of FIG. 1, the module (including the two balanced foils), the module frame, and the array frame being in accordance with embodiments of the present invention.
Figure 2B:
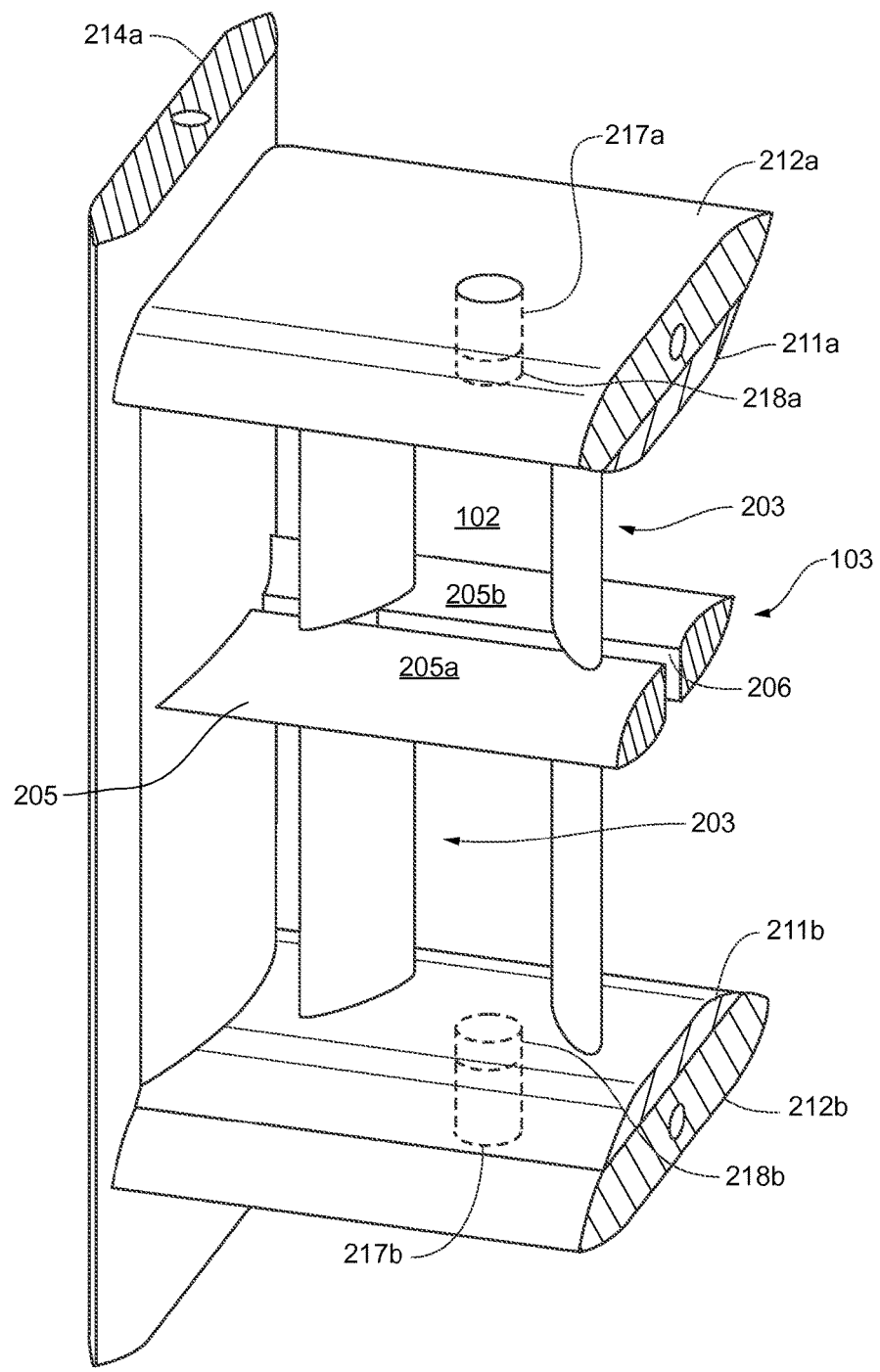

FIGS. 2A and 2B are different perspective views of a portion of system 100. In particular, FIGS. 2A and 2B show a cell 102 of array frame 101, the cell 102 being defined by the following elements of array frame 101: horizontal elements 212b (shown in FIG. 2A and FIG. 2B) and 212a (shown in FIG. 2B); and vertical elements 214a (shown in FIG. 2A and FIG. 2B) and 214b (shown in FIG. 2A). Water energy conversion module 103 is installed in the illustrated cell 102. Module 103 comprises two balanced foils 203 mounted to structures housed within a central fairing 205. The foils 203 are mounted for two degrees of freedom including rotational and translational movement. Translational movement occurs within the slot 206 between fairing portions 205a and 205b. In some embodiments, translational movement may be purely lateral. In other embodiments, it may include translational movement along an arc-shaped path (see, e.g., the embodiment of FIG. 13) that is also considered to be "lateral" in that the motion has some lateral components. The two illustrated adjacent foils 203 are controlled to remain in antiphase (both with respect to rotational oscillation and translational oscillation) and are positioned relative to each other to promote flutter oscillation. Arrangement of adjacent foils in moving water for flutter oscillation is further described in U.S. Pat. No. 4,184,805 (Arnold), U.S. Pat. No. 6,273,680 (Arnold), and U.S. Pat. No. 8,469,663 (Kerr). The disclosures of these patents are hereby incorporated by reference.

Module 103 also includes module frame elements including horizontal module frame elements 211b (shown in FIG. 2A) and 211a (shown in FIG. 2B) and vertical module frame elements 215a (shown in FIG. 2A and FIG. 2B) and 215b (shown in FIG. 2A).

As shown in FIG. 2A, vertical elements of the module frame and the array frame are shaped so that, when a module 103 is placed into cell 102, the combined shape formed by an array frame element and any abutting module frame elements is a hydrodynamic shape. This can be seen by looking, for example, at the cross section of the shape formed by the combination of module frame element 215a and array frame element 214a (or 215b and 214b). The right hand half of element 214a's cross section along with element 215a's cross section forms half of an elongated elliptical structure and the surface borders of the elements when module 103 is installed maintain a curved surface through the elements' surface interface without significant discontinuities. In this particular embodiment, the shape formed by the combination of an array frame vertical element and the abutting module frame vertical elements of adjacent installed modules (on either side of vertical array frame element 214a) would form a full elongated elliptical shape, somewhat similar in character to the shape of foils 203. Similarly hydrodynamic shapes are formed by abutting horizontal array frame and module frame elements. This can be seen by FIG. 2B's illustration of the cross section of array frame element 212a along with the cross section of module frame element 211a and, similarly, the cross sections of array frame element 212b and module frame element 211b.

As shown in FIGS. 2A and 2B, horizontal module frame element 211b includes interface unit 218b and array frame element 212b includes interface unit 217b. These elements allow formation of a high pressure sealed conduit connection between a conduit housed in unit 212b and a conduit housed in unit 211b. Further details of this interface connection are described below in the context of FIGS. 12A and 12B. As shown in FIG. 2B, similar interface elements facilitate connection at the top of module 103 between module frame element 211a and array frame element 212a. Specifically, horizontal module frame element 211a includes interface unit 218a and array frame element 212a includes interface unit 217a.

Figure 3:
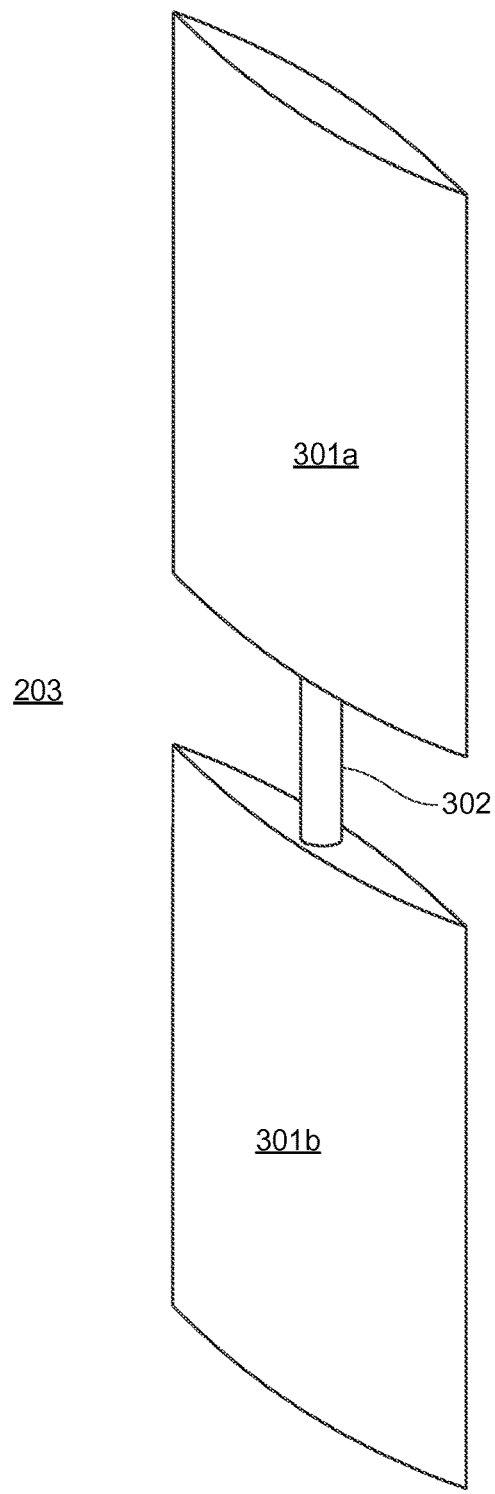
FIG. 3 illustrates further details of an exemplary balanced foil shown in FIGS. 2A-2B.

FIG. 3 illustrates further details of a balanced foil 203 of the embodiment of FIGS. 2A-2B. As shown in FIG. 3, balanced foil 203 includes an upper foil portion 301a (referenced herein as a "semifoil") and a lower foil portion ("semifoil") 301b joined by a shaft 302. Preferably shaft 302 is only long enough to pass through the power and control mechanism within central fairing 205 (shown in FIG. 2A-2B) and provide clearance between fairing 205 and the inner edges of each semifoil. The upper semifoil portion 301a is disposed above the fairing, while the lower semifoil portion is disposed below the fairing. The movement of the semifoils under the influence of moving water actuates the mechanisms contained within the fairing (not shown in FIG. 3).

The use of a balanced foil arrangement allows the force exerted on each semifoil by fluid drag to offset such that the net torque normal to the motion of the fluid stream is minimized. This permits the foils and their connecting shafts to undergo less stress while being maintained vertically parallel with respect to each other.

Figure 4:
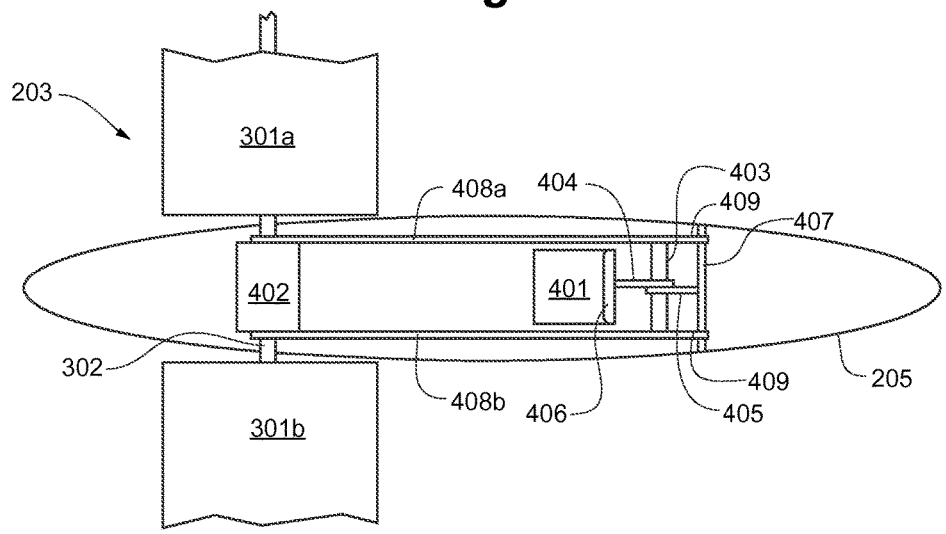
FIG. 4 shows a side view of one embodiment in accordance with the present invention of a translational transducer for converting between lateral motion of the foils of the embodiment of FIG. 1 and fluid pressure. A rotational transducer for converting between rotational motion of the foils and fluid pressure is also referenced in FIG. 4.

FIG. 4 shows a side view of one embodiment of the balanced foil system's lateral and rotational actuators for converting between lateral and rotational motion of foil 203 on the one hand and fluid pressure on the other hand. These elements are sometimes referenced herein as "transducers" in the general sense because they convert between kinetic energy associated with rotational and translational movement of an oscillating balanced foil to energy in the form of fluid pressure. In the illustrated embodiment, fluid pressure in rotational transducer 402 is used primarily for monitoring and control purposes and fluid pressure in translational transducer 401 is used for power transmission.

The two lever arms, 408a and 408b are attached on one end to the rotational control cylinder 402, which houses shaft 302 connecting upper and lower semifoils 301a and 301b. Lever arms 408a and 408b are attached at their other end to pivot shaft 407 which in turn is rigidly attached to the mounting structure of central fairing 205. This arrangement provides axial rigidity along the flow axis. Pivot shaft 407 is further connected to linkages 409 (shown in FIGS. 5A-5C) and 405 to piston rod 404. As shown more clearly in FIGS. 5A-5C, linkages 409 and 405 are pivoted by pivot shafts 407, 411, and 403. Piston rod 404 is attached to piston 406.

Movement of piston 406 by piston rod 404 in response to translational movement of balanced foil 203 causes a hydraulic pressure pulse to move through hydraulic cylinder 401. A cross-bracing (not shown) may be added between the lever arms for added torsional rigidity by holding the semifoils in a vertical position while being free to translate or to rotate on a vertical axis. Translational power cylinder 401 is double-acting, meaning that valves (not separately shown in FIG. 4) are provided such that fluid is maintained in the cylinder on both sides of piston 406 as it oscillates so that translational energy is converted to fluid pressure both as piston 406 moves from right to left and as it moves from left to right (from the perspective shown in FIG. 4) as balanced foil 203 undergoes flutter oscillation.

Figure 5A:
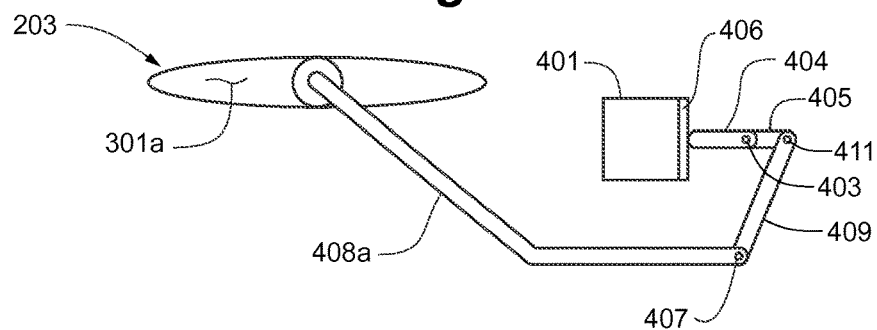
FIGS. 5A, 5B, and 5C show a top view of the embodiment elements shown in FIG. 4 at three different phases of a balanced foil's lateral motion.
Figure 5B:
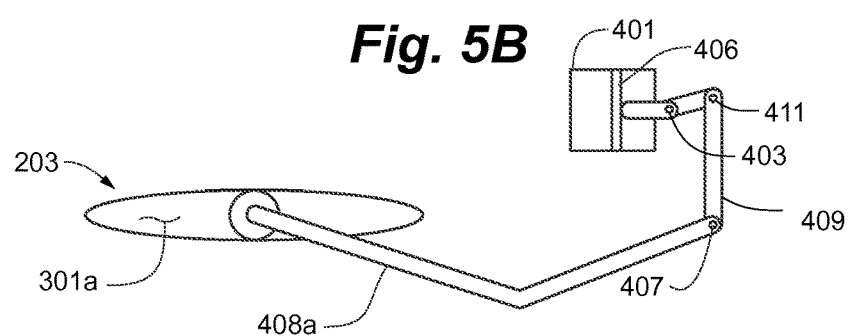
Figure 5C:
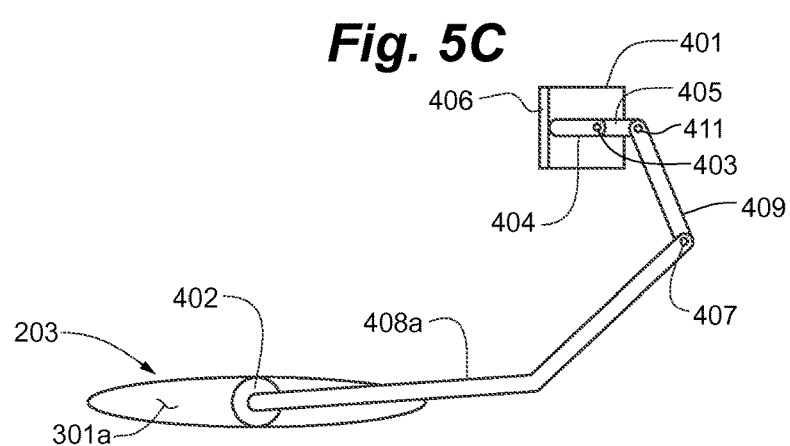

FIGS. 5A, 5B, and 5C show a top view of the embodiment portion shown in FIG. 4. As shown, in this embodiment, lever arms 408a and 408b (only 408a shown in top view) are bent to maximize the possible range of translational motion for foil 203 without lever arms 408 impinging on cylinder 401. FIGS. 5A, 5B, and 5C show three phases of foil 203's translational position during a power stroke. As foil 203 moves translationally from the beginning (FIG. 5A) to the middle (FIG. 5B) to the end (FIG. 5C) of a stroke, the illustrated mechanism moves piston 406 from one end of cylinder 401 to another, thereby generating fluid pressure.

Figure 6A:
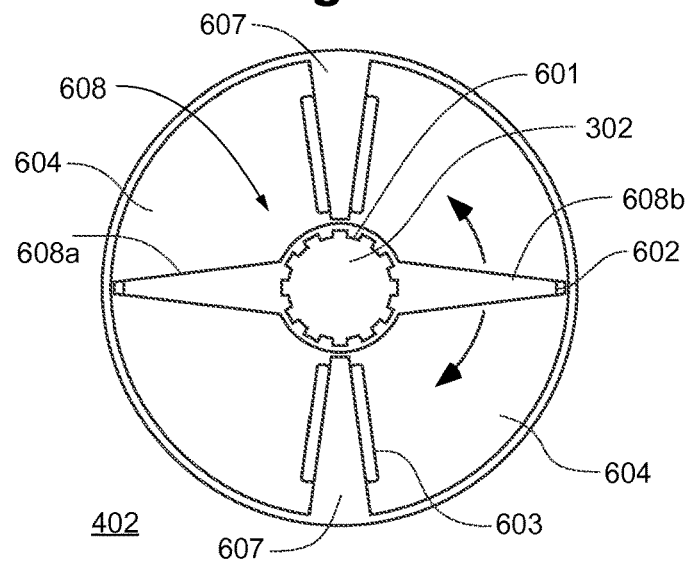
FIGS. 6A and 6B show different cross-sectional top views of the rotational control transducer of FIG. 4.
Figure 6B:
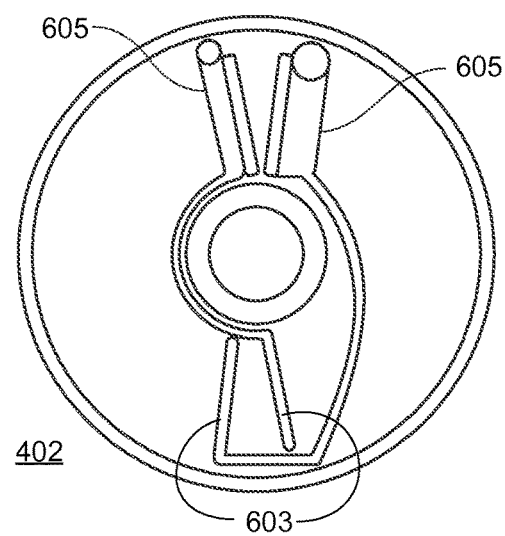

FIGS. 6A and 6B show cross-section top views of rotational control transducer 402 of FIG. 4. The top and bottom of rotational control transducer 402 are mounted rigidly to, respectively, lever arms 408a and 408b (shown in FIG. 4). The lever arm assembly holds the control cylinder securely in a vertical position. Rotational control forces are provided hydraulically via conduits in lever arms 408a and 408b (not separately shown here but shown in FIG. 7). Position sensing, monitoring, and foil geometry modification signals are also carried in conduits built into the lever arms, and are connected into the rotating foil connecting shaft through sealed rotating fluidic joints (shown and described in further detail in the context of FIG. 7).

Referring to FIG. 6A, transducer 402 comprises an impeller 608 including two arms 608a and 608b on either side of a circular cavity 609. Shaft 302 of balanced foil 203 is splined and secured to transducer 402 within cavity 609 by spline 601. The rotational control impeller 608 is shown in FIG. 6A in the central position (zero foil pitch). The impeller can rotate approximately 35 degrees in either direction (clockwise or counterclockwise), the motion being bounded by cylinder partitions 607. Impeller 608 is rotated by hydraulic pressure in chambers 604 applied through the control pressure ports 603. The impeller arms carry seals 602 at their periphery to prevent leakage. In some embodiments, ports 603 are alternatively pressure or exhaust ports.

FIG. 6B shows a cross section below the cross section shown in 6A. As shown, manifolds 605 are located within the lower end of the control cylinder to conduct the flow of hydraulic fluid in and out of the chambers of the cylinder (through ports 603) to the connections to hydraulic conduits in the lever arms 408a and 408b. The corresponding conduits in lever arms 408a and 408b are shown in FIG. 7.

Figure 7:
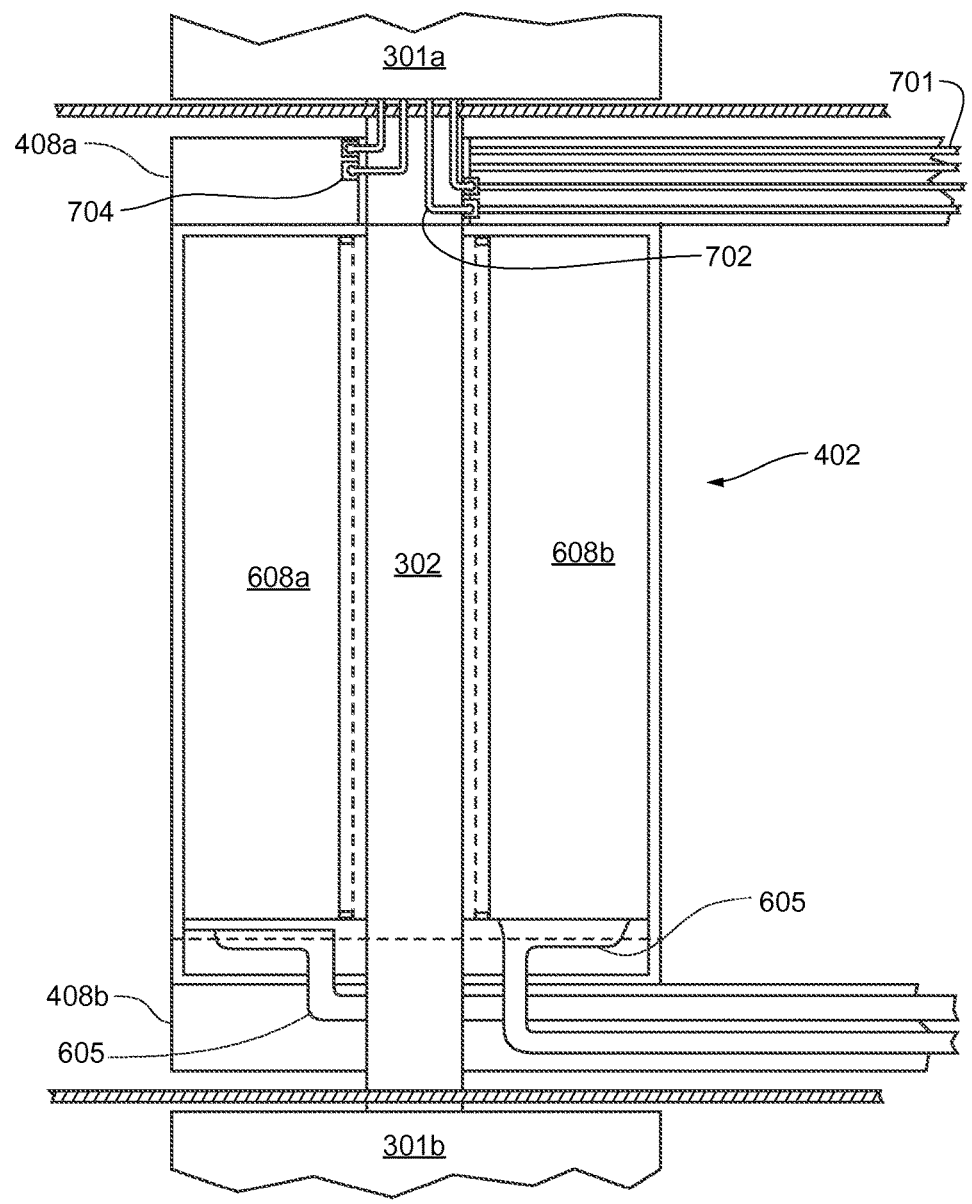
FIG. 7 shows a schematic diagram of various hydraulic conduits that run through lever arms shown in FIG. 4 including conduits that deliver fluid pressure for controlling the rotational transducer shown in FIG. 4 and conduits that deliver fluid pressure for controlling a shape of the semifoils of a balanced foil.

FIG. 7 shows a schematic diagram of various hydraulic conduits that run through lever arms 408a and 408b of FIG. 4 and deliver fluid pressure to rotational transducer 402 and to upper semifoil 301a of balanced foil 203 (similar hydraulic conduits to lower semifoil 301b exist but are not separately shown). As shown, shaft 302, which joins upper semifoil 301a and lower semifoil 301b, runs through rotational transducer 402 as previously described. As previously described, conduits 605 deliver fluid pressure for control of rotational transducer 402 through ports 603 (both shown in FIG. 6). As shown in FIG. 7, conduits 605 run through lever arm 408b. FIG. 7 also shows conduits 701 and 702 which run through lever arm 408a and deliver fluid pressure to upper semifoil 301a. Similar conduits, not separately shown, run through lever arm 408b and deliver fluid pressure to lower semifoil 301b. This allows adaptively shaping the foils to minimize vortex effects during certain phases of the foil oscillation cycle as also shown and described in U.S. Pat. No. 8,469,663. Grooves 704 in an inner portion of lever arm 408a fill with fluid to provide a fluidic joint around a portion of shaft 302 fit within lever arm 408a. Similar grooves are in lever arm 408b to form a fluidic joint with a lower portion of shaft 302, but are not separately shown.

Figure 8:
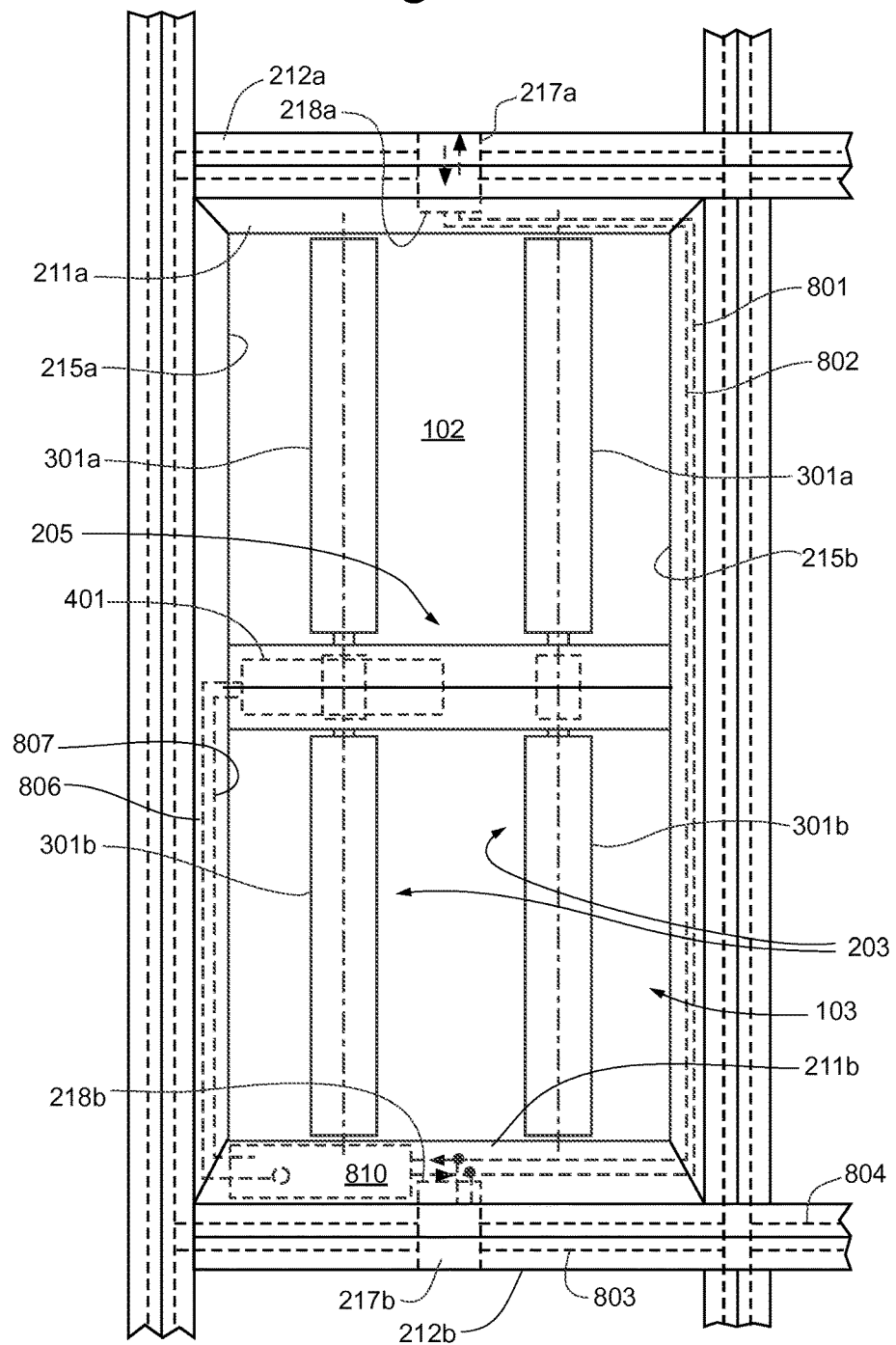
FIG. 8 illustrates the power hydraulic circuit for the module of FIGS. 2A-2B and shows connections between the high pressure hydraulic circuit portion housed within the module frame and the high pressure circuit portion housed within the array frame of FIG. 1.

FIG. 8 shows the power hydraulic circuit for module 103 within a cell 102 of array frame 101 and shows connections between the high pressure hydraulic circuit portion housed within the frame of module 103 and the high pressure circuit housed portion within array frame 101. Components of module 103 such as the two balanced foils 203 (each comprising an upper semifoil 301a and a lower semifoil 301b) are shown for context. These and other module components that have been described previously and are not further described here except as necessary for explaining the illustrated power hydraulic circuit.

High pressure manifold 801 and return manifold 802 run within the module frame from top interface unit 218a to bottom interface unit 218b. Manifolds 801 and 802 also connect as shown to module decoupler 810. Bottom interface unit 218b, housed in module frame horizontal element 211b, allows connection to interface unit 217b, housed in array frame horizontal element 212b. Interface unit 217b is in turn coupled to high pressure manifold 803 and return manifold 804 housed in array frame horizontal element 212b. Interface units 218b and 217b thus provide connection between manifolds 801 and 802 in the module frame and manifolds 803 and 804 in the array frame.

Low pressure conduits 806 and 807 (supply and return) run between translational power cylinder 401 and module decoupler 810. In the embodiment shown, there is one translational transducer and the module's two balanced foils are mechanically coupled for antiphase translational oscillation (mechanical coupling structures are not separately shown to avoid over-complicating the drawings). In alternative embodiments, for example, in which particularly large foils are used, it may be desirable to provide a separate translational transducer for each balanced foil.

Figure 9:
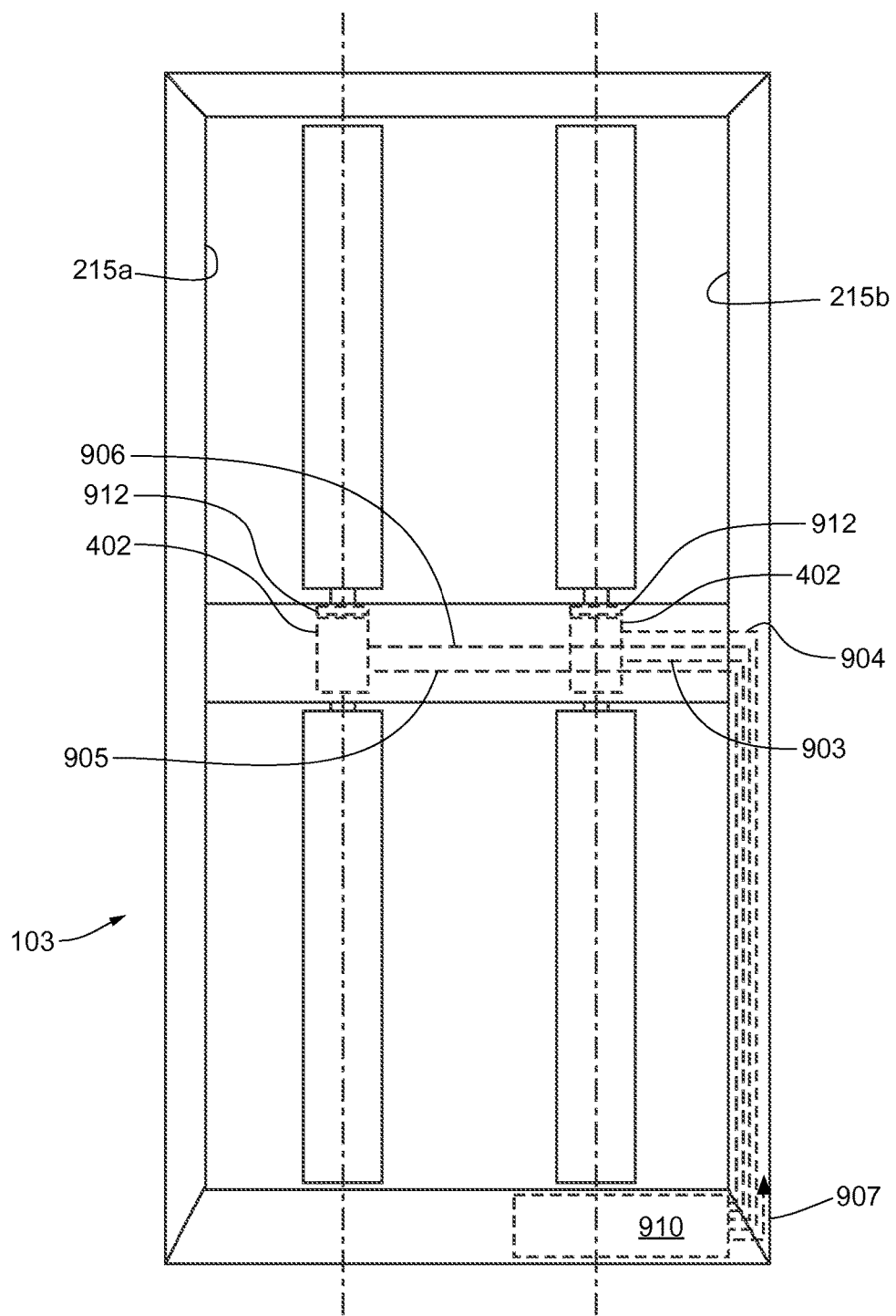
FIG. 9 illustrates the rotational hydraulic control circuit of the module of FIGS. 2A-2B for controlling rotational pressure in the rotational transducer of FIG. 4.

FIG. 9 illustrates module 103's rotational hydraulic circuit for controlling rotational pressure in rotational actuators 402. Conduits 903 and 904 (supply and return) are coupled to convey fluid pressure between autonomous control module 910 and a first of the two illustrated rotational actuators 402. Conduits 905 and 906 (supply and return) are coupled to convey rotational fluid pressures between autonomous control module 910 and the other of the two illustrated rotational transducers 402. Conduits 907 (only partially shown to avoid over complicating the drawing) are coupled to convey fluid pressure between autonomous control module 910 and position sensors 912 coupled to cylinders 402. Position sensors 912 are used to provide information on the rotational phase position (pitch) of each foil and that information is then usable by system control modules (not separately shown) so that appropriate control pressures are supplied to cylinders 402. Autonomous control module 910 is coupled through a multi-channel cable (not separately shown) which, in particular embodiments may be electronic or microhydraulic, to an above-water master controller (not separately shown). For example, the master controller may receive monitoring signals from each module 103 in array frame 101 and transmit corrective signals when necessary to any module operating outside of predetermined specifications. In some embodiments, the master controller may contain a flutter motion algorithm that utilizes performance data from respective modules 103 to determine whether to employ corrective actions at one or more modules 103.

FIG. 10a illustrates details of a first embodiment of module decoupler 810 of FIG. 8. To understand the function and purpose of module decoupler 810, it is helpful to understand the relationship of hydraulic power transmission circuits in the overall system of FIG. 1. As previously described, the modules in the submerged array of FIG. 1 are linked to the master hydraulic accumulator 111 in the illustrated above-water power generation plant by high pressure line 109 (supply and return lines present but not separately shown). High pressure line 109 is part of a primary high pressure hydraulic circuit that includes high pressure manifolds housed in the array frame (e.g., high pressure manifold 803 and return manifold 804 shown in FIG. 8) and high pressure manifolds housed in each module frame (e.g., high pressure manifold 801 and return manifold 802 shown in FIG. 8).

In addition to the primary high pressure circuit described above (which links the modules to the above-ground accumulator 111 of FIG. 1), individual secondary lower pressure hydraulic circuits exist in each module. As described in the context of FIG. 8, the low pressure hydraulic circuit in each module includes a double-acting lateral power cylinder 401 and a module decoupler 810, which are connected via conduits 806 and 807. In operation, double-acting cylinder 401 delivers, to module decoupler 810, hydraulic pulses from the lateral power strokes as the foils 203 oscillate from side-to-side in antiphase. Module decoupler 810 (which exists in each module 103) converts pressure from the low-pressure loop in each module to a high preset system distribution pressure so that each module's output can contribute effectively to the separate high-pressure primary loop running throughout the array and, via high pressure conduit 109, to the above-water master accumulator 111. In other words, the decoupler effectively transfers the varying low pressure hydraulic pulses from the bidirectional cylinders connected to the foils in each module into a preset high pressure (at a correspondingly lower flow rate) hydraulic output fed into the primary hydraulic power circuit.

By way of overview, decoupler 810 includes a variable-ratio leveraged connector between two pistons coupled respectively to the above-referenced low pressure and high pressure circuits; the connector's leverage ratio is governed by a water speed sensor. The higher the water speed, the lower the leverage ratio. In various embodiments, the water speed sensor can be a vane inside a pilot tube integral to the module frame, mechanically connected to the adjustable lever system, or it can be a fluidic or electronic water speed sensor, electrically or fluidically connected to adjust the leverage ratio.

Turning in detail to the particular embodiment illustrated in FIG. 10a, incoming hydraulic pressure from the hydrofoil motion (converted to hydraulic pressure by translational transducer 401 as previously described) enters decoupler 810 through conduit 806. Hydraulic fluid returns from decoupler 810 to transducer 401 through conduit 807. The incoming hydraulic fluid proceeds through a sliding valve assembly 1008, whose purpose is to deliver the hydraulic pressure to the appropriate end of a large-diameter double-acting hydraulic cylinder 1009. Piston 1041 connected to piston rod 1013 moves back and forth under the influence of fluid pressure in double-acting cylinder 1009.

The position of sliding valve 1008 is selected by an actuator slider 1010 with two projections 1011. Actuator slider 1010 is moved by an attachment 1012 that is in turn connected to cylinder piston rod 1013. As the piston rod moves between its extreme positions, the actuator slider projections are caused to engage a projection 1014 from the sliding valve assembly 1008, shifting the valve between its two possible positions. The sliding valve 1008 positions are maintained throughout the cylinder movements by a toggle spring 1015.

Pressurized hydraulic fluid enters cylinder 1009 through conduit 1016 or 1018 (depending on the position of sliding valve assembly 1008) and through a one-way valve 1017, causing piston 1041 to move through the cylinder. While piston 1041 is moving, hydraulic fluid from the previous cycle of the double-acting cylinder is expelled through orifice 1019 or 1049 (depending on piston 1041's direction of movement), through sliding valve assembly 1008, to the hydraulic fluid return conduit 807.

Piston rod 1013 also engages lever arm 1020 through rotating bearing 1025 running in a central slot 1044 in lever arm 1020, and so causes lever arm 1020 to pivot about a stationary mounting shaft that provides pivot point 1021.

A small diameter double-acting high pressure cylinder 1022 is mounted coaxially with the low pressure cylinder 1009. High pressure piston rod 1023 moves piston 1042 back and forth within cylinder 1022. Lever arm 1024 is pivotally attached to the high pressure piston rod 1023. Lever arm 1024 also engages with lever arm 1020 through a rotating bearing 1026 in slot 1044 of lever arm 1020. Lever arm 1024 engages similarly with lever arm 1045 through a rotating bearing 1029 in slot 1042 of lever arm 1045. Lever arm 1045 pivots about a stationary mounting shaft that provides pivot point 1027.

The other end of lever arm 1045 is pivotally connected at pivot point 1028 to arm 1061 which, in turn is connected via a lever arm (lever arm 1062 shown in FIG. 10b) to drag-type water speed sensor 1046, located in an area of free water flow outside of the housing of the balanced foil module. A constant-rate extension spring 1030 connects pivot point 1028 to a stationary mounting 1031.

When sensor 1046 is exposed to water flow, spring 1030 is extended proportionately to the water flow rate, causing lever arm 1045 to pivot counterclockwise about its pivot 1027, drawing lever arm 1024 away from pivot 1028, effectively reducing the reduction ratio of lever arms 1020 and 1024 resulting in the motion of the low pressure piston rod 1013 being more closely matched to the motion of high pressure cylinder piston rod 1023. When the water current past the sensor 1046 is reduced, the same mechanism increases the movement reduction ratio between the piston rod ends, providing additional mechanical advantage to the lower energy hydraulic pulses (transmitted through piston rod 1013) from the hydrofoils, such that final output of the high pressure cylinder 1022 can match the specified distribution system pressure. In some embodiments, an anti-backlash mechanism, servomechanism or screw-jack may be employed to prevent the very high forces bearing on lever arms 1020 and 1024 from feeding back into sensor 1046 and corrupting water flow rate data.

The output of the high pressure cylinder is delivered to high pressure manifold 801 via one-way valves 1034. The return hydraulic fluid flows back through the return conduit 802 via one-way valves 1054.

In the operation of decoupler 810, low pressure piston 1041 operates generally through a full range of available motion in low pressure cylinder 1009. The range of motion of high-pressure piston 1042 within high pressure cylinder 1022 is defined by the flow-governed variable ratio mechanical transmission mechanism comprising the illustrated arrangement of lever arms 1020, 1024, and 1045 (along with associated pivots and bearings) and water speed sensor 1046; the overall mechanism being coupled between low pressure piston rod 1013 and high pressure piston rod 1023. In sum, and as described above, this arrangement recognizes that, when the water of water body 106 (see FIG. 1) is flowing at higher speed, a module's hydrofoils will provide greater energy in the form of fluid pressure to cylinder 1009, and thus piston rod 1013 will require less mechanical advantage in its movement relative to piston rod 1023 in order for the decoupler to maintain sufficient output fluid pressure from cylinder 1022. On the other hand, when the water of water body 106 is flowing at a lower speed, a module's hydrofoils will provide less energy in the form of fluid pressure to cylinder 1009, and thus piston rod 1013 will require greater mechanical advantage in its movement relative to piston rod 1023 in order for decoupler 810 to maintain sufficient output fluid pressure from cylinder 1022. The illustrated arrangement accomplishes the necessary leverage adjustment in response to the local water flow acting upon water speed sensor 1046.

FIG. 10b illustrates a side view of a portion of the embodiment of FIG. 10a. As shown, the direction of water flow is right to left. Water speed sensor 1046 in this embodiment is attached to lever arm 1062. When water is flowing in the indicated direction, lever arm 1062 begins to rotate clockwise about a stationary mounting shaft that provides pivot point 1064. This draws arm 1061 in a direction opposite the water flow direction (i.e., to the right as shown) which in turn extends spring 1030 and, as previously described, causes arm 1045 to pivot counterclockwise about pivot point 1027.

FIG. 11 illustrates an alternative to the embodiment of FIG. 10a for implementing a module decoupler. In the embodiment of FIG. 11, the sliding valve assembly and associated components are replaced by a solenoid-based valve system. Elements in FIG. 11 that are identical to those in FIG. 10a are not numbered and referenced again except to the extent necessary for explaining operation of the illustrated solenoid valve embodiment and its context. This alternative facilitates a simpler design with fewer mechanical components for achieving the necessary switching between hydraulic pathways to either end of the illustrated low-pressure hydraulic cylinder at the cost of requiring use of electrical components in an underwater environment. Incoming hydraulic pressure from the hydrofoil motion enters decoupler 1100 through conduit 806. Hydraulic fluid from decoupler 810 to the hydrofoil mechanism through conduit 807. The incoming hydraulic fluid proceeds through two solenoid-operated latching two-way valves 1107, whose purpose is to deliver the hydraulic pressure to the appropriate end of large-diameter double-acting hydraulic cylinder 1109.

Two normally-open microswitches 1108 are mounted so that their switch leaves 1014 are actuated by a projection 1111 attached to piston rod 1113 at each end of its range of motion as piston 1141 oscillates in cylinder 1109. Each microswitch is connected via a low voltage electrical power source 1110 to its respective solenoid, as well as to each other. When either microswitch is actuated, the solenoid valves change position, and remain latched in that position until actuated again.

FIGS. 12A-12B are schematic diagrams illustrating the operation of module interface units 218b and 217b of FIGS. 2A-2B. These interface units facilitate installation of foil module 103 in array frame 101.

FIG. 12A shows the two interface units in context when the module is aligned within a cell 102 of frame 101 and ready for connection, but just prior to the interface connection being engaged. As shown, interface unit 217b resides in horizontal array frame element 212b and interface unit 218b resides in horizontal module frame element 211b.

For ease and clarity of description purposes, the module-side interface portion 218b is designated as "receptor" 218b and the array-side interface portion 217b is designated as "injector" 217b. Injector unit 217b comprises a cylindrical transfer connector core 1201 that fits inside a cylindrical transfer connector sleeve 1202 whose cap 1203 is initially flush with injector 217b's surface. Core 1201 is held away from sleeve cap 1203 by a compression spring 1204. Transfer connector sleeve 1202 itself slides in a cylindrical bore 1222 of injector 217b. These sliding fits are tight enough to be waterproof. Transfer sleeve 1202 has holes 1210 and 1207 and interface conduit channel 1209. Once the connection is fully engaged, as further described below in the context of FIG. 12B, holes 1210 and 1207 and interface conduit channel 1209 are aligned with array frame conduit element 1211 and module frame conduit element 1208 such that a high pressure fluid connection between 1211 and 1208 is established. Receptor unit 218b includes an insert compression spring 1206 and a receptor bore 1228.

As shown in FIG. 12A, the corresponding module 103 (shown in FIGS. 2A-2B) is inserted fully into the array frame and locked into place. Transfer connector sleeve 1202 is aligned with receptor 218b. However, in FIG. 12A the hydraulic connection has not yet been completed.

FIG. 12B shows receptor 218b and injector 217b once the connection is completed. To complete the connection, core 1201 is pushed upwards by hydraulic pressure (available in the array frame) so that cap 1203 enters the receptor bore 1229 and pushes against the receptor insert spring 1206, which is of a lower spring rate than the compression spring 1204. Connector sleeve 1202 therefore pushes cap 1203 against receptor insert spring 1206, compressing it fully without compressing the compression spring 1204. This allows the connector sleeve 1202 to enter receptor bore 1228 and pass the outgoing hydraulic conduit without at any time exposing it to water.

Further upward pressure on the transfer core 1201 now begins to compress the compression spring 1204 which, when fully compressed, allows opening 1207 in the connector sleeve 1202 to line up with the outgoing hydraulic conduit 1208 and the interconnecting conduit 1209. At the same time, opening 1210 in the sleeve 1202 will have lined up with the incoming hydraulic conduit 1211, allowing pressurized hydraulic fluid to pass through the entire assembly from array frame conduit 1211 through interconnecting conduit 1209 to module frame conduit 1208.

For purposes of illustration, just one interconnecting conduit 1209 that joins one array frame conduit 1211 to a module frame conduit 1208 is shown. However, an injector core 1201 can be fitted with additional interconnector conduit channels, transfer sleeve 1202 can be formed with additional openings, and injector cylinder 1222, sleeve 1202, and receptor cylinder 1228 can be made correspondingly larger to accommodate, for each module, interconnection between many more array frame conduits and corresponding module frame conduits.

Interface coupling units such as unit 217b and unit 218b described above can carry the high pressure manifold and return (if used) as well as sensor and control actuator connections—electrical or fluidic. The array frame coupling unit 217b remains sealed until a module is inserted and locked into position, which aligns the respective frame and module coupling units 217b and 218b, and initiates the mating of couplers (by hydraulic pressure) as described above to form a sealed, watertight connection. The above described interconnection process can be reversed to extract a module from the array frame.

Figure 13:
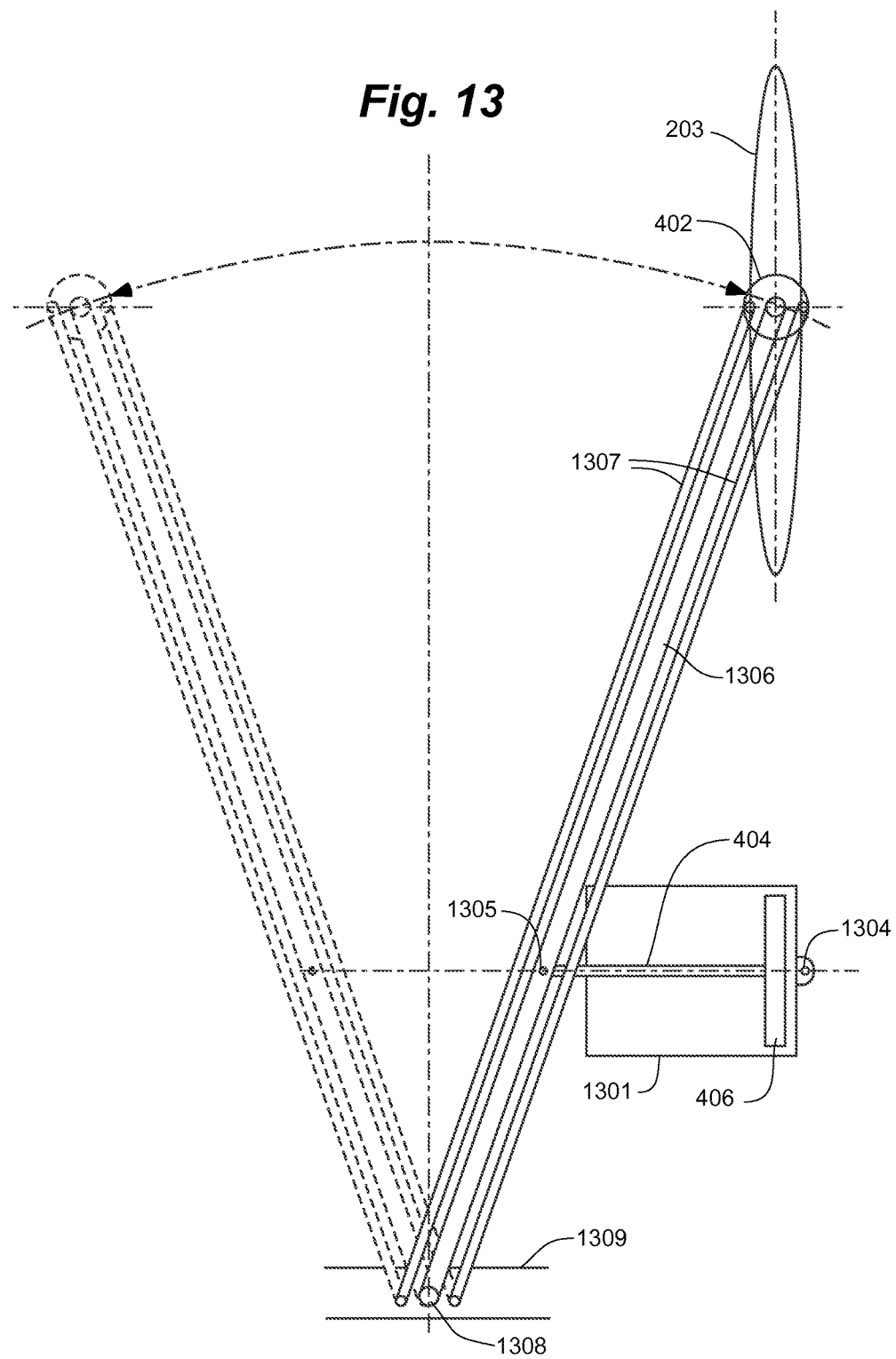
FIG. 13 illustrates a top view of an alternative embodiment in accordance with the present invention for the lateral power mechanism illustrated in FIGS. 4 and 5a-5c.

FIG. 13 illustrates a top view of an embodiment for a lateral power mechanism that is an alternative to the embodiment illustrated in FIGS. 4 and 5a-5c. Elements that are not necessarily changed relative to the embodiment of those earlier figures are shown with the same reference numbers previously used to provide context. As in the earlier shown embodiment, balanced foil 203 is mounted in rotational transducer 402. Rotational transducer 402 is attached upper and lower support rods 1306 (only one shown in the drawing because the drawing is a top view), which can swing from side to side about the support rod pivot point 1308. Alignment rods 1307 are pivoted to the rotational transducer and to the frame 1309 of the mechanism. The purpose of alignment rods 1307 is to maintain the forward alignment of the rotational transducer throughout the arc of motion of the rotational transducer and the foil. However, in an alternative embodiment, alignment of the rotational transducer may be maintained without the illustrated alignment rods by instead programming a dynamic hydraulic bias into the rotational motion of the transducer.

Lateral power cylinder 1301 is substantially similar to lateral power cylinder 401 of FIG. 4. However, unlike cylinder 401, cylinder 1301 is pivoted at pivot point 1304. Piston rod 406 is pivotally attached to support rods 1306 at pivot point 1305. Lateral motion of foil 203 (which, in the embodiment of FIG. 13 is along an arc-shaped pathway) results in linear movement of piston 406 back and forth within the double-acting cylinder 1301. As with cylinder 401 shown in earlier figures, cylinder 1301 would, for both directions of movement, convert the lateral foil movement to hydraulic pressure delivered to the module's local hydraulic circuit.

FIGS. 14A and 14B illustrate side (FIG. 14A) and top (FIG. 14B) views of an embodiment for a rotational transducer 1401 that is an alternative to rotational transducer 402 of FIG. 4.

Referring to FIG. 14A, cylinder 1401 is mounted in the center of the balanced foil mechanism, between upper and lower semifoils. Foil shaft 302 extends through cylinder 1401, projecting above and below the cylinder, to mount upper and lower semifoils as previously described. A splined bushing 1403 is attached to the part of the foil mounting shaft inside that is inside of cylinder 1401, rotating with the shaft.

A cylindrical internally splined insert 1404 acts as a free piston inside rotational cylinder 1401. As shown in FIG. 14B, insert 1404 carries a curved slot 1405 in its outer surface. Referring to both FIGS. 14A and 14B, a small wheel 1406 pinned to the inside surface of cylinder 1401 engages curved slot 1405. When pressurized hydraulic fluid is introduced into one of the ports 1407a or 1407b, piston 1404 is forced either up (if pressure is introduced up through port 1407b) or down (if pressure is introduced through port 1407a) within cylinder 1401 causing piston 1404 to rotate.

Piston 1404 rotates as it moves vertically and rotating pin 1406, which protrudes from a fixed position of the inner wall of cylinder 1401, engages in curved slot 1405 of piston 1401. Because piston 1404 is splined to the foil mounting shaft 302, the rotation of the piston causes the foil mounting shaft to rotate, according to the vertical movement of the piston.

Differential control of the hydraulic pressures at both of the hydraulic input-output ports 1407a and 1407b therefore controls the pitch angle of the attached foil. The hydraulic control pressures to effect this pitch angle control can be delivered to the rotational cylinder in the same way as described in the context of earlier figures for delivering pressure to the rotational cylinder 1402.

Figure 15:
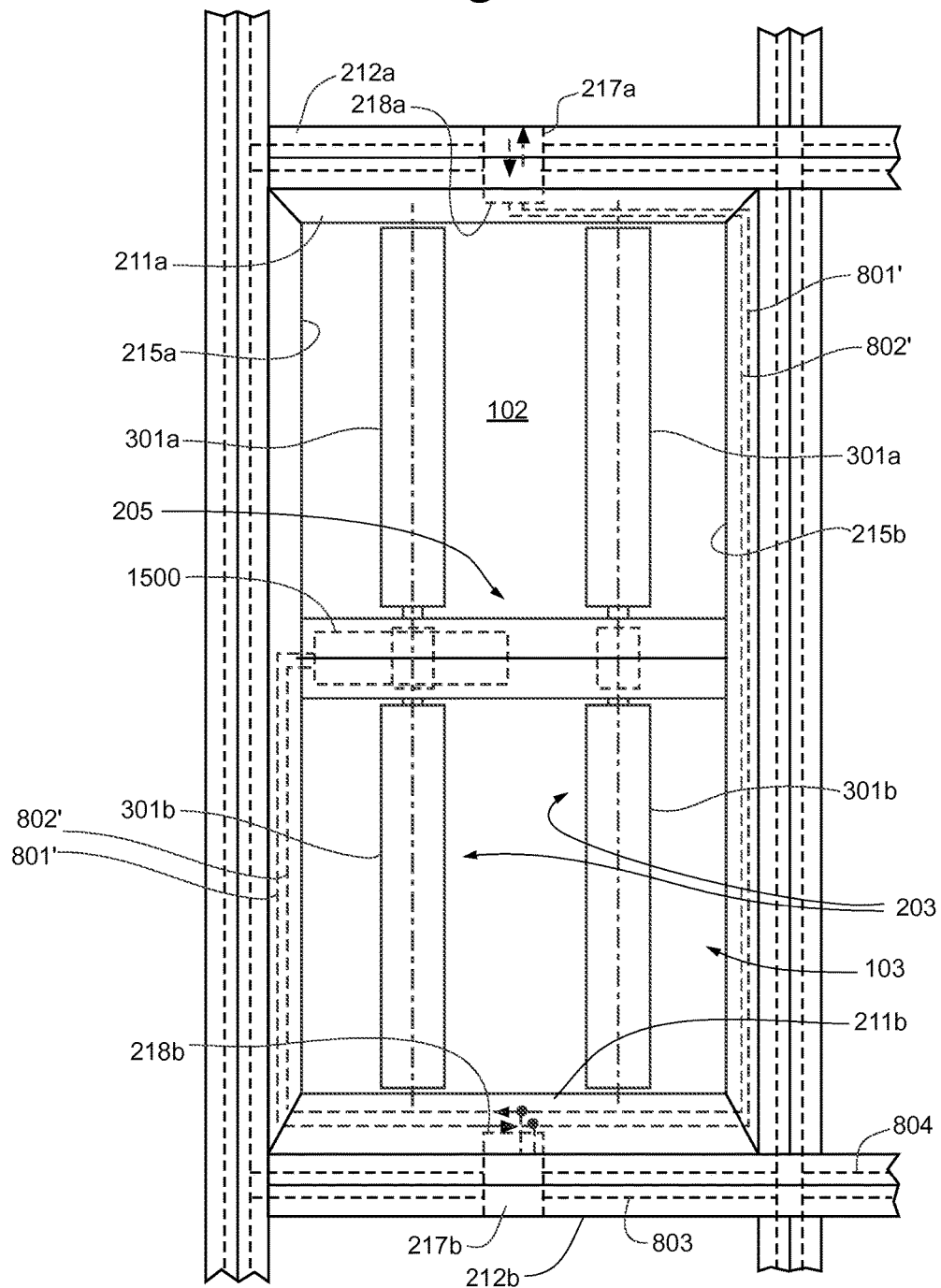
FIG. 15 illustrates the power hydraulic circuit for the module of FIGS. 2A-2B including a translational transducer in accordance with an alternative embodiment of the present invention.

FIG. 15 illustrates a power hydraulic circuit for the module of FIGS. 2A-2B that includes a translational actuator in accordance with an alternative embodiment of the present invention. FIG. 15 shows a power hydraulic circuit housed within the frame of module 103 within a cell 102 of array frame 101, and connections between the power hydraulic circuit and the high pressure circuit housed within array frame 101. The power hydraulic circuit shown in FIG. 15 includes a translational transducer 1500. To understand the function and purpose of translational transducer 1500, it is helpful to return to the relationship of hydraulic power transmission circuits within a module as shown in FIG. 8.

FIG. 15 is similar to FIG. 8 except that double-acting lateral power cylinder 401 and module decoupler 810 are replaced by translational transducer 1500, and the low pressure manifolds 806 and 807 connecting the double-acting lateral power cylinder 401 and module decoupler 810 are eliminated in favor of modified high pressure manifold 801' and return manifold 802' that run directly to translational transducer 1500. The other module components shown in FIG. 8 and that have been described previously, such as the two balanced foils 203, remain in FIG. 15 and are not further described here except as necessary for explaining the illustrated power hydraulic circuit. Moreover, module components that are not further described here function in the illustrated power hydraulic circuit of FIG. 15 as described with respect to FIG. 8.

In the embodiment of FIG. 15, translational transducer 1500 directly connects hydrofoil motion to high pressure manifold 801' and return manifold 802' by being mechanically linked to the balanced hydrofoils 203. Manifolds 801' and 802' run within the frame of module 103 from top interface unit 218a to bottom interface unit 218b. Bottom interface unit 218b, housed in module frame horizontal element 211b, allows connection to interface unit 217b, housed in array frame horizontal element 212b. Interface unit 217b is in turn coupled to high pressure manifold 803 and return manifold 804 housed in array frame horizontal element 212b. Interface units 218b and 217b thus provide connection between high pressure manifold 801' and return manifold 802' in the frame of module 103 and manifolds 803 and 804 in array frame 101.

Figure 16:
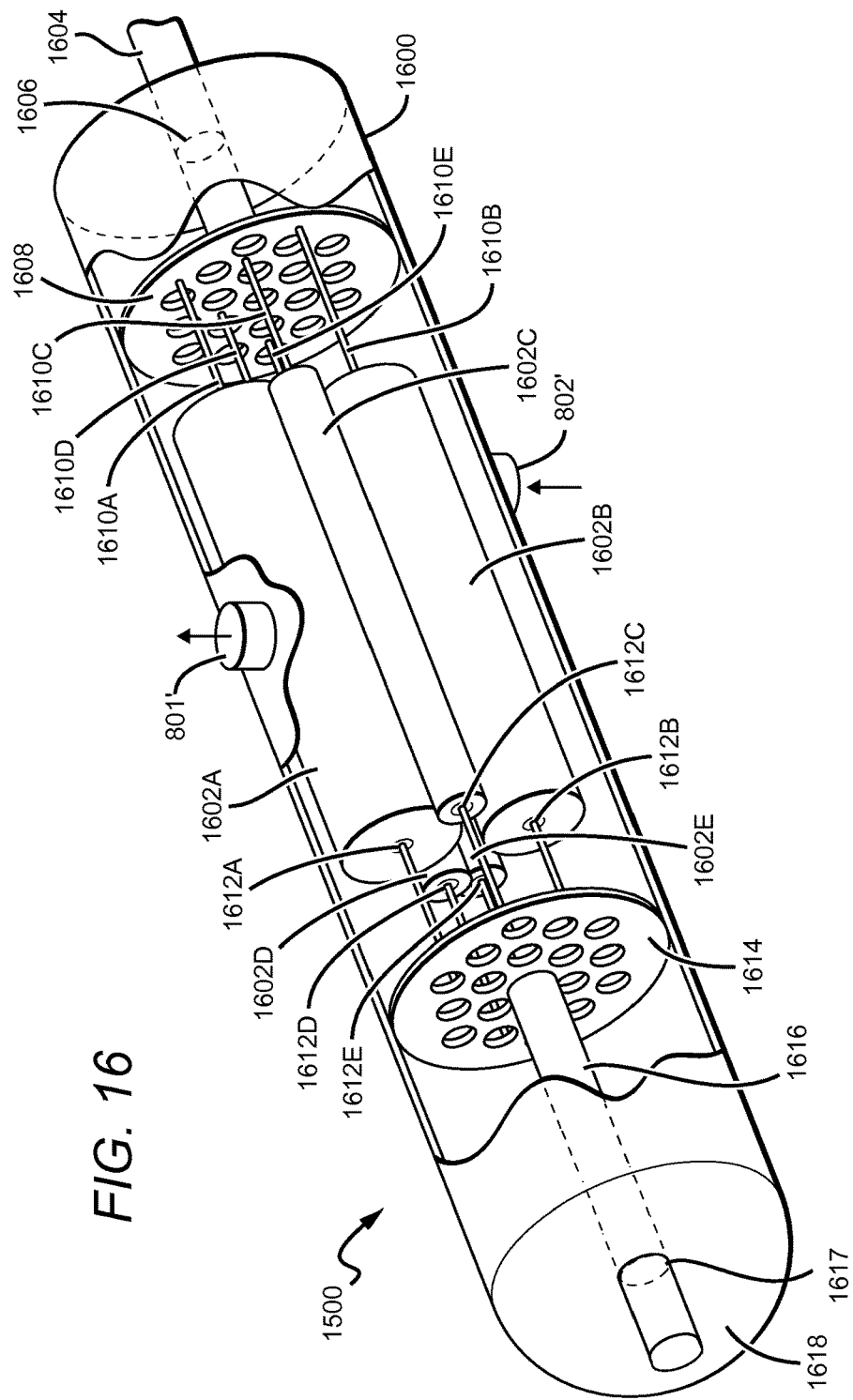
FIG. 16 illustrates a perspective view of a translational transducer in accordance with an embodiment.

FIG. 16 illustrates a perspective, cutaway view of translational transducer 1500 in accordance with the embodiment of FIG. 15. Translational transducer 1500 converts the translational movement of the foils into fluid pressure transmitted through high pressure manifold 801'. Translational transducer 1500 includes an assembly of hydraulic sub-cylinders that are used to match a determined amount of hydrofoil motion to the uniform pressure of the high pressure line. Translational transducer 1500 comprises a sealed enclosure 1600 and a fully enclosed assembly of internal hydraulic double-acting sub-cylinders, e.g., sub-cylinders 1602A-1602E, that are rigidly mounted parallel to each other within sealed enclosure 1600. The assembly of internal hydraulic double-acting sub-cylinders 1602A-1602E is also rigidly mounted to the interior of sealed enclosure 1600. The sub-cylinders of the assembly, e.g., sub-cylinders 1602A-1602E, are preferably of different bore (and piston) diameters, but of identical stroke lengths. For example, sub-cylinders 1602A-1602E may have their bore diameters defined according to a predetermined relationship and relate to each other such that when sub-cylinder 1602A represents 10 units (e.g., cm, dm or other units), sub-cylinder 1602B represents 20 units, sub-cylinder 1602C represents 40 units, sub-cylinder 1602D represents 80 units and sub-cylinder 1602E represents 160 units. It will be appreciated that other relative relationships between the double-acting hydraulic cylinders are possible. Further, while the five double-acting hydraulic cylinders shown in FIG. 16 are exemplary, more or fewer hydraulic cylinders may be employed in various other embodiments.

A main piston rod 1604 acts upon the assembly of hydraulic sub-cylinders to directly connect hydrofoil motion to high pressure line 109 (shown in FIG. 1). Main piston rod 1604 at one end is physically or mechanically linked and directly responsive to translational movement of the balanced foils 203 (shown in FIG. 15), thus enabling a hydraulic pressure pulse to move through translational transducer 1500. At the end opposite the physical or mechanical link to the balanced foils 203, main piston rod 1604 enters sealed enclosure 1600 through bearing 1606, which permits the translational movement of main piston rod 1604 within sealed enclosure 1600, and terminates at rigid collector plate 1608.

Rigid collector plate 1608 is connected to a plurality of sub-cylinder piston rods, e.g., piston rods 1610A-1610E for each of sub-cylinders 1602A-1602E, respectively, such that at one end all of the sub-cylinder piston rods 1610A-1610E terminate at rigid collector plate 1608, and all of the sub-cylinders 1602A-1602E operate in synchronism. As such, rigid collector plate 1608 is linked to the hydrofoils 203 making up module 103 such that the motion of the hydrofoils is transmitted identically to all of the plurality of pistons (shown in FIG. 17) within the internal double-acting sub-cylinders, e.g., sub-cylinders 1602A-1602E, in the enclosed assembly via sub-cylinder piston rods 1610A-1610E. In the embodiment of FIG. 16, rigid collector plate 1608 is perforated to substantially reduce or mitigate drag from movement within the fluidic environment of sealed enclosure 1600, such as when main piston rod 1604 is responsive to the translational movement of the balanced foils 203.

Sub-cylinder piston rods 1610A-1610E enter each of sub-cylinders 1602A-1602E through respective bearings (not separately shown in FIG. 16, but one of which is shown as bearing 1611A in FIGS. 18A-18C), and exit each of sub-cylinders 1602A-1602E through respective ones of bearings 1612A-1612E. These bearings through each end of sub-cylinders 1602A-1602E permit translational movement of the sub-cylinder piston rods 1610A-1610E through each of their respective sub-cylinders 1602A-1602E. Sub-cylinder piston rods 1610A-1610E terminate at end plate 1614. In the embodiment of FIG. 16, end plate 1614, similar to rigid collector plate 1608, is perforated to substantially reduce or mitigate drag from movement within the fluidic environment of sealed enclosure 1600. Further, end plate 1614 may optionally include an end plate rod 1616 that stabilizes the piston rods 1610A-1610E from torsional or other forces as they translate synchronously through each of their respective sub-cylinders 1602A-1602E. End plate rod 1616 may enter sealed enclosure 1600 through bearing 1617 and terminate at end plate 1614. Bearing 1617 permits the translational movement of end plate rod 1616 within sealed enclosure 1600. As shown in FIG. 16, sealed enclosure 1600 is of sufficient length such that end plate 1614, attached to rod 1616, may translate to a maximum point within sealed enclosure 1600 without end plate 1614 abutting against the interior of sealed enclosure wall 1618.

In the operation of translational transducer 1500, different combinations of cylinder diameters are selectably connected to high-pressure manifold 801' using, for example, hydraulically or electrically-operated valves, such that the varying energy output, and hence pressure, of each module in the submerged array of FIG. 1 is matched to the pressure of high-pressure manifold 801'. The particular combination of sub-cylinders to be connected at any moment is governed by the speed of the water traversing the module at any moment. For example, a data reduction procedure such as the method of bins may be used to group test data into water speed intervals (bins) and to record, for each bin, a number of samples and a sum of parameter value samples. The average parameter value within each water speed bin can then be evaluated to select which sub-cylinder valves to connect to the high pressure manifold 801'. All un-selected sub-cylinders remain open at both ends, causing zero or negligible pressure circulation of hydraulic fluid from one end of the cylinder to the other when actuated, essentially freewheeling. As hydrofoil motion is relatively slow, this circulation does not significantly increase the hydraulic drag as a fraction of total power generated. Thus, in the embodiment of FIG. 16, translational transducer 1500 receives return hydraulic fluid from manifold 802' that creates a fluidic environment within sealed enclosure 1600. Then, directly responsive to a determined amount of hydrofoil motion, one or more sub-cylinders or combinations of sub-cylinders may be selected in the assembly for connection to high pressure manifold 801' in the module frame and the high-pressure manifold 803 housed in the array frame and shown in FIG. 15.

Figure 17:
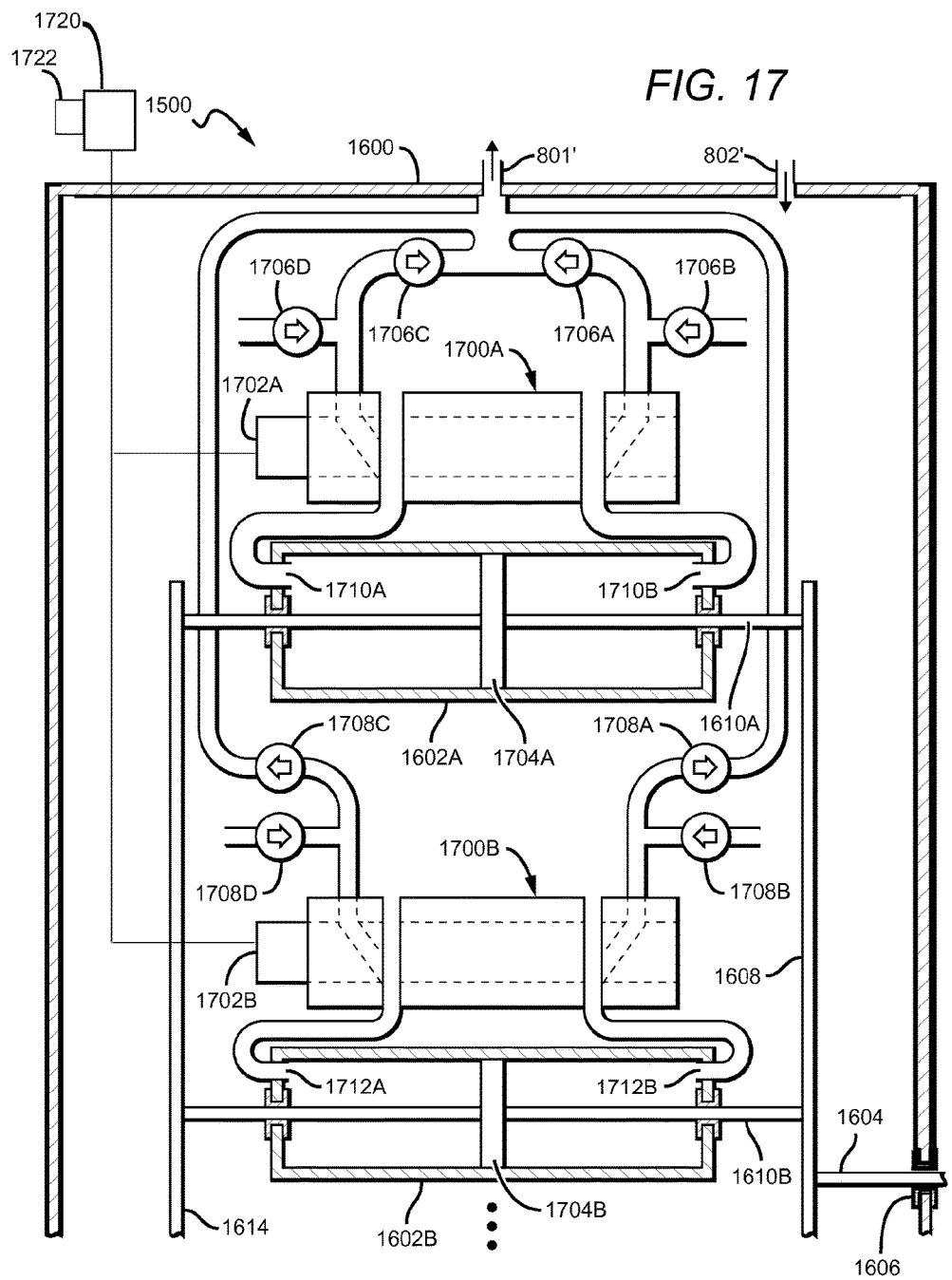
FIG. 17 illustrates an internal view of a portion of the translational transducer in accordance with an embodiment.

FIG. 17 illustrates an internal view of a portion of the translational transducer 1500 in FIG. 16 in accordance with an embodiment. Each sub-cylinder 1602A-1602E of translational transducer 1500 is equipped with a two-channel rotational selector valve. For example, in the portion of translational transducer 1500 shown in FIG. 17, sub-cylinders 1602A-1602B are equipped with two-channel rotational selector valves 1700A-1700B, respectively. In the embodiment of FIG. 17, the bore diameters and associated manifold tubing of the selector valves 1700A-1700B are proportional in diameter to their respective sub-cylinders, so that a selector valve for a relatively large diameter cylinder will have larger bore diameters and associated manifold tubing than that of a smaller sub-cylinder (the relative scale of sub-cylinders 1602A and 1602B is not reflected in FIG. 17 but is instead shown in FIG. 20).

Selector valves 1700A-1700B have two possible rotational positions: an activated valve position that connects the corresponding sub-cylinder to an output pressure manifold; and a deactivated valve position that connects the corresponding sub-cylinder to the interior of sealed enclosure 1600, which is filled with return hydraulic fluid received through inlet tube 802' from the aboveground power plant. Thus, the selector valves connect or disconnect each corresponding sub-cylinder in the assembly to or from the output pressure manifold such that only the selected sub-cylinder or sub-cylinders participate in the hydraulic power generation resulting from motion of the hydrofoils.

In the embodiment of FIG. 17, the selector valves 1700A-1700B may be rotated between their two rotational positions by an attached hydraulic or electric rotational actuator 1702A-1702B, respectively, as may be directed by a selector valve controller 1720, which may be located either internal to translational transducer 1500 or external to translational transducer 1500 (as shown). For example, selector valve controller 1720 may use the method of bins (described above) to take into account water speed at the module, such as measured by a water flow meter 1722. Selector valve controller 1720 may then match the power absorption capability of the module to the manifold pressure by activating one or more selector valves 1700 via respective rotational actuators 1702 to connect selected sub-cylinders or combinations of sub-cylinders in the assembly to high pressure manifold 801'. In this way, all of the energy available to each module, at its location in the stream, is transmitted to the master accumulator at a uniform pressure.

In operation, the pistons 1704A-1704B connected to main piston rod 1604 via sub-cylinder piston rods 1610A-1610B are double-acting. Non-return valves 1706A-1706D and 1708A-1708D within the tubing for sub-cylinders 1602A and 1602B, respectively, are provided such that fluid is maintained in the sub-cylinders on both sides of pistons 1704A and 1704B as they oscillate. Thus, as balanced foil 203 undergoes flutter oscillation, translational energy is converted to fluid pressure both as pistons 1704A and 1704B move from right to left and left to right (from the perspective shown in FIG. 17). The non-return valves allow or prevent low pressure hydraulic fluid from inside sealed enclosure 1600 to be drawn into a sub-cylinder through cylinder end ports, e.g., through end ports 1710A or 1710B and 1712A or 1712B for sub-cylinders 1602A and 1602B, respectively. Likewise, the non-return valves permit the escape of pressurized fluid in the power stroke through the cylinder end ports, e.g., through end ports 1710A or 1710B (depending on whether the power stroke is currently left to right or right to left) and 1712A or 1712B for sub-cylinders 1602A and 1602B, respectively.

Figure 18A:
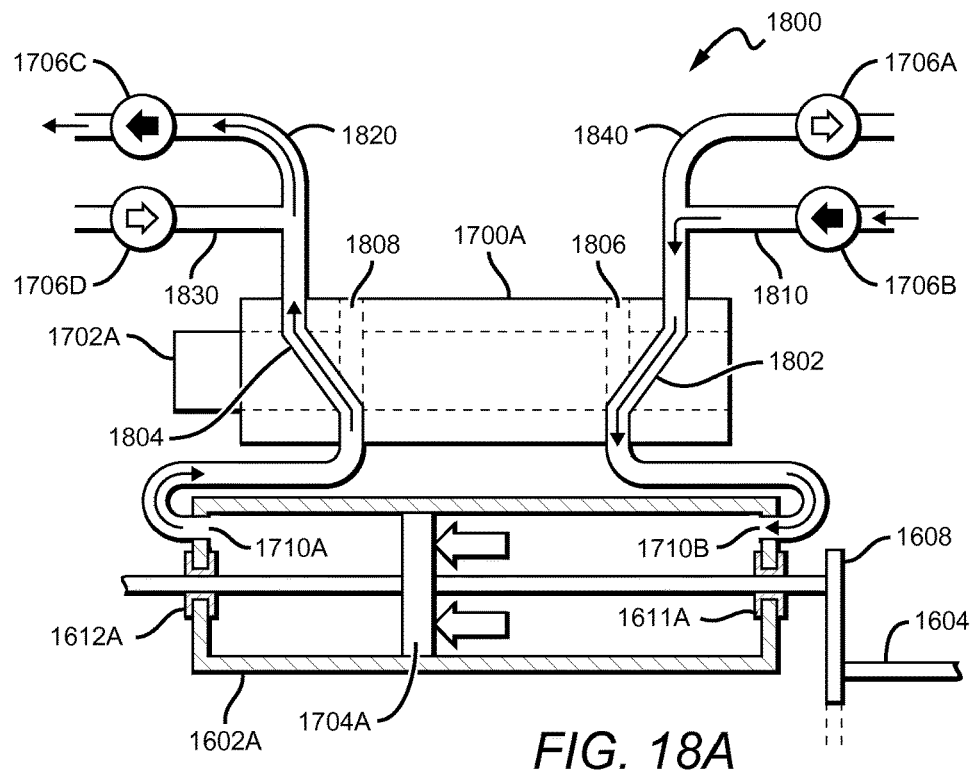
FIGS. 18A-18C show fluid flows based on selector valve operation for a cylinder of a translational transducer in accordance with an embodiment.
Figure 18B:
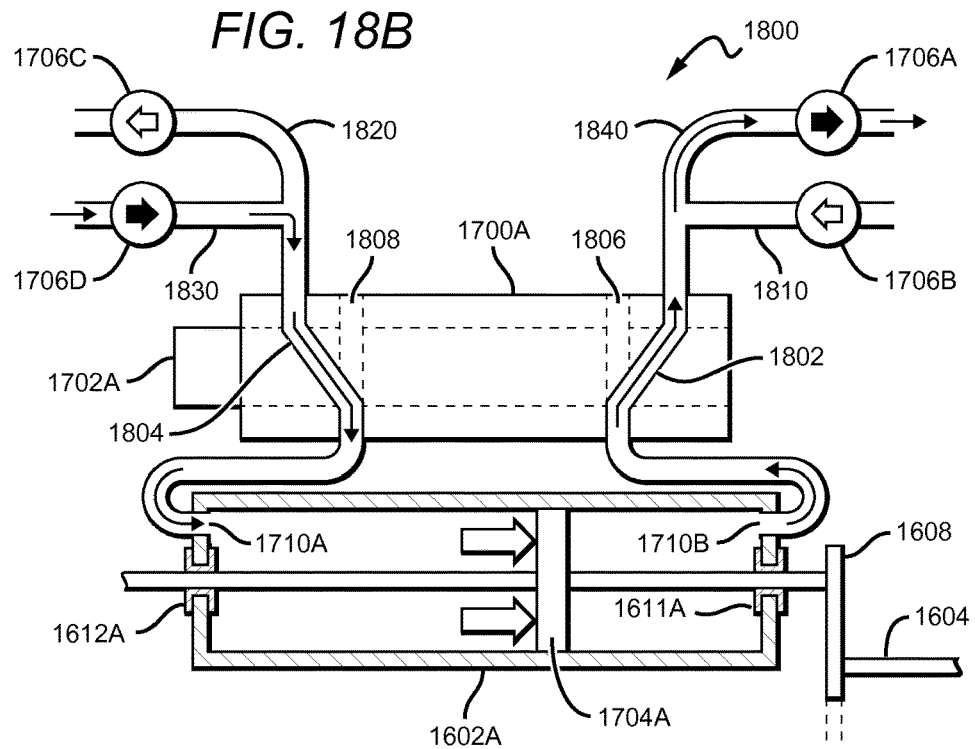
Figure 18C:
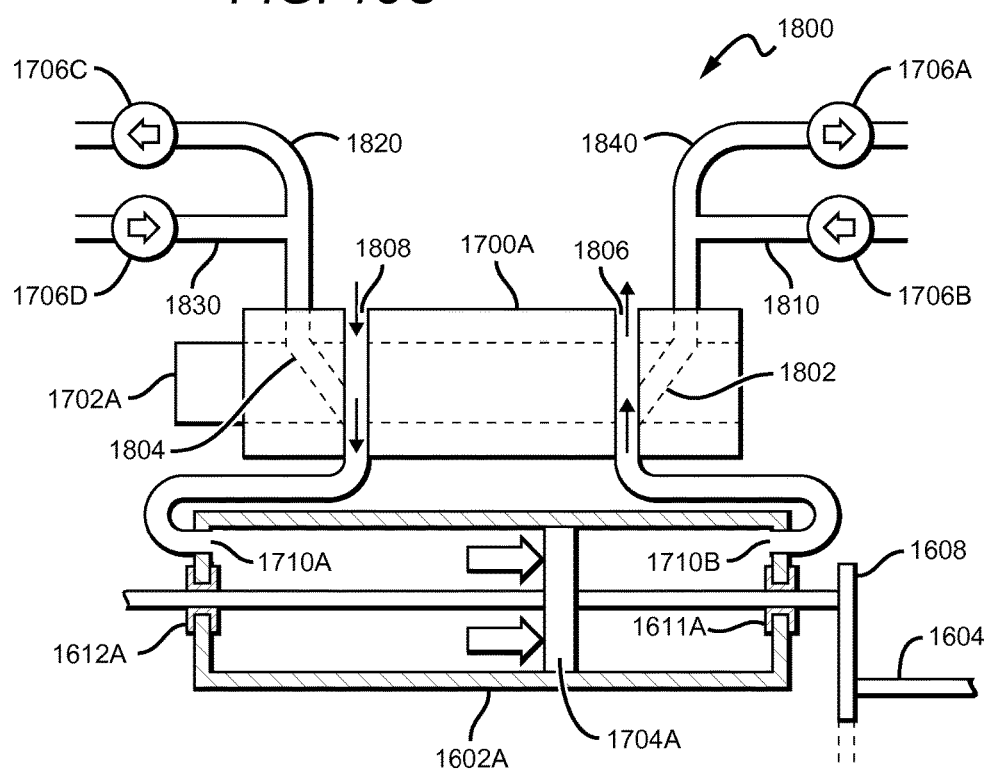

FIGS. 18A-18C show fluid flows based on selector valve operation for a cylinder of a translational actuator in accordance with an embodiment. While sub-cylinder 1602A is used as an example in FIGS. 18A-18C, the selector valve operations shown apply to any sub-cylinder of the assembly within translational transducer 1500.

In the embodiments of FIGS. 18A-18C, rotating valve 1700A consists of two parallel sections because in operation, as the piston 1704A is moved back and forth by the oscillatory motion of the hydrofoils, pressure strokes are delivered alternately from both ends of the sub-cylinder. Accordingly, non-return valves 1706B and 1706D allow low-pressure hydraulic fluid from within sealed enclosure 1600 to be drawn into the returning side of sub-cylinder 1602A, but do not permit the escape of pressurized fluid in the power stroke. Conversely, non-return valves 1706A and 1706C permit the escape of pressurized fluid from sub-cylinder 1602A to the system high pressure manifold in the power stroke, but do not allow low pressure hydraulic fluid from within sealed enclosure 1600 to be drawn into the sub-cylinder 1602A.

FIG. 18A shows a cylinder selector valve operation 1800 for sub-cylinder 1602A as piston 1704A moves from right to left. In the embodiment of FIG. 18A, when the rotational selector valve 1700A is turned to an activated position by rotational actuator 1702A, fluid passageways 1802 and 1804 to input manifold 1810 and output manifold 1820, respectively, are created by an alignment of openings through selector valve 1700A. Further, the pressurized environment created within cylinder 1602A as piston 1704A moves from right to left causes non-return valves 1706B and 1706C (associated with manifolds 1810 and 1820, respectively) to open and non-return valves 1706A and 1706D to close. In operation, low pressure hydraulic fluid from within sealed enclosure 1600 is drawn through input manifold 1810, open non-return valve 1706B, and passageway 1802 into sub-cylinder 1602A via cylinder end port 1710B. Then, as piston 1704A translates from right to left responsive to the translational movement of the balanced foils 203 as communicated through main piston rod 1604 and collector plate 1608, fluid pressurized from the translational power stroke escapes sub-cylinder 1602A through cylinder end port 1710A, and is directed through passageway 1804 to output manifold 1820. The pressurized fluid then flows through open non-return valve 1706C to the system high pressure manifold (i.e., outlet 801' shown in FIG. 17).

FIG. 18B shows an activated cylinder selector valve operation 1800 for sub-cylinder 1602A as piston 1704A moves from left to right. In the embodiment of FIG. 18B, when the rotational selector valve 1700A is turned to an activated position by rotational actuator 1702A, fluid passageways 1804 and 1802 to input manifold 1830 and output manifold 1840, respectively, are created by an alignment of openings through selector valve 1700A. Further, the pressurized environment created within cylinder 1602A as piston 1704A moves from left to right causes non-return valves 1706D and 1706A (associated with manifolds 1830 and 1840, respectively) to open and non-return valves 1706B and 1706C to close. In operation, low pressure hydraulic fluid from within sealed enclosure 1600 is drawn through input manifold 1830, open non-return valve 1706D, and passageway 1804 into sub-cylinder 1602A via cylinder end port 1710A. Then, as piston 1704A translates from left to right responsive to the translational movement of the balanced foils 203 as communicated through main piston rod 1604 and collector plate 1608, fluid pressurized from the translational power stroke escapes sub-cylinder 1602A through cylinder end port 1710B, and is directed through passageway 1802 to output manifold 1840. The pressurized fluid then flows through open non-return valve 1706A to the system high pressure manifold (i.e., outlet 801' shown in FIG. 17).

FIG. 18C illustrates shows a deactivated cylinder selector valve operation in accordance with an embodiment. In the embodiment of FIG. 18C, when the rotational selector valve 1700A is turned to a deactivated position by rotational actuator 1702A, fluid passageways 1806 and 1808 to sealed enclosure 1600 are created by an alignment of openings through selector valve 1700A and non-return valves 1706A-1706D remain closed. In operation, as piston 1704A moves from left to right (as shown), low pressure hydraulic fluid from within sealed enclosure 1600 is drawn through passageway 1808 into sub-cylinder 1602A via cylinder end port 1710A. Then, as piston 1704A translates from left to right responsive to the translational movement of the balanced foils 203 as communicated through main piston rod 1604 and collector plate 1608, unpressurized fluid to the right of the piston escapes sub-cylinder 1602A through cylinder end port 1710B, and is directed through passageway 1806 back into the interior of sealed enclosure 1600. As such, the un-actuated sub-cylinder remains open at both ends, causing zero-pressure circulation of hydraulic fluid from one end of the sub-cylinder to the other when actuated, causing an essentially freewheeling fluidic circuit. Likewise, as piston 1704A moves from right to left (not shown), low pressure hydraulic fluid from within sealed enclosure 1600 is drawn through passageway 1806 into sub-cylinder 1602A via cylinder end port 1710B. Then, as piston 1704A translates from right to left responsive to the translational movement of the balanced foils 203 as communicated through main piston rod 1604 and collector plate 1608, unpressurized fluid to the left of the piston escapes sub-cylinder 1602A through cylinder end port 1710A, and is directed through passageway 1808 back into the interior of sealed enclosure 1600.

Figure 19:
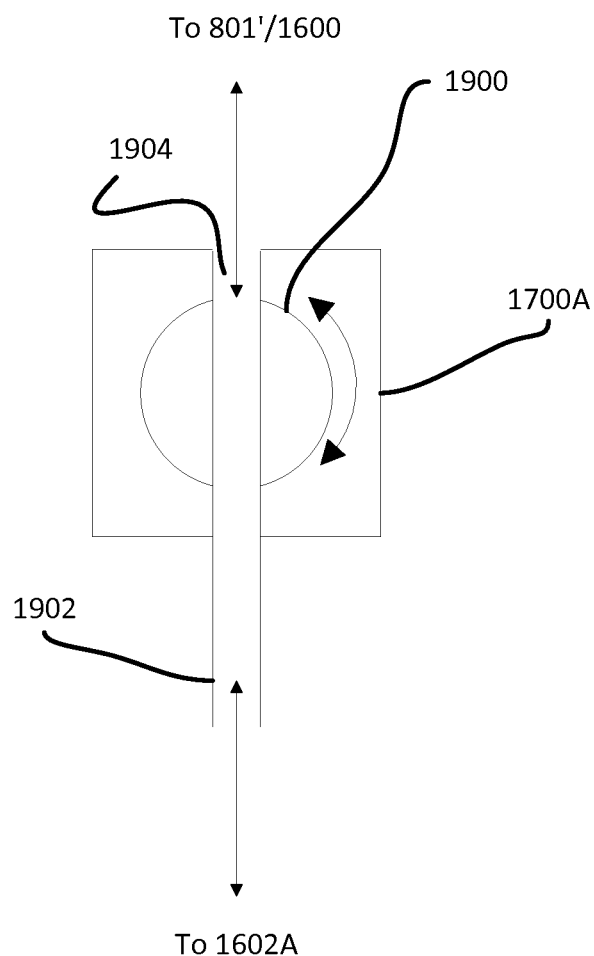
FIG. 19 illustrates an end view of a rotating valve portion of a selector valve in accordance with an embodiment.

FIG. 19 illustrates an end view of a rotating valve portion of a selector valve in accordance with an embodiment. FIG. 19 shows a detail of one of the selector valves, e.g., selector valve 1700A, for each sub-cylinder of the assembly of translational transducer 1500. In the embodiment of FIG. 19, a rotating valve 1900 serves to activate or deactivate an associated sub-cylinder, e.g., sub-cylinder 1602A, according to which of two positions (e.g., 90° apart) it is set to by a hydraulic or electrical rotational actuator, e.g., rotational actuator 1702A (shown in FIG. 17).

In the embodiment of FIG. 19, rotating valve 1900 consists of two parallel sections because in operation, the sub-cylinder piston is moved back and forth by the oscillatory motion of the hydrofoils, so the power strokes are delivered alternately from both ends of the sub-cylinder. Accordingly, non-return valves 1706B or 1706D allow low pressure hydraulic fluid from inside sealed enclosure 1600 to be drawn into the returning side of the sub-cylinder but do not permit the escape of pressurized fluid in the power stroke.

In operation, on the power stroke compression side of a sub-cylinder piston, when the rotational selector valve 1900 is in an activated position uniform pressure hydraulic fluid from an associated sub-cylinder, e.g., sub-cylinder 1602A, is received at selector valve port 1902, directed through selector valve port 1904 and past non-return valves, e.g., non-return valves 1706A or 1706C (shown in FIGS. 18A and 18B) to the module high pressure manifold 801' (which in turn is connected to the array-wide high pressure manifold 803). When the rotational selector valve 1900 is in the non-activated position, fluid from sub-cylinder 1602A is instead directed from selector valve port 1902, through selector valve port 1904, and into the low pressure fluid return chamber (i.e., the interior of sealed enclosure 1600) during a power stroke compression.

On the side of the sub-cylinder piston opposite the compression of the power stroke, when the rotational selector valve 1900 is in an activated position return hydraulic fluid from enclosure 1600 is received at selector valve port 1904 (after being directed past non-return valves, e.g., non-return valves 1706B or 1706D (shown in FIGS. 18A and 18B)) and directed through selector valve port 1902 to the interior of sub-cylinder 1602A. Similarly, when the rotational selector valve 1900 is in the non-activated position on the side of the sub-cylinder opposite the power stroke, fluid from the low pressure fluid return chamber (i.e., the interior of sealed enclosure 1600) is directed from selector valve port 1904 through selector valve port 1902 to sub-cylinder 1602A.

Figure 20:
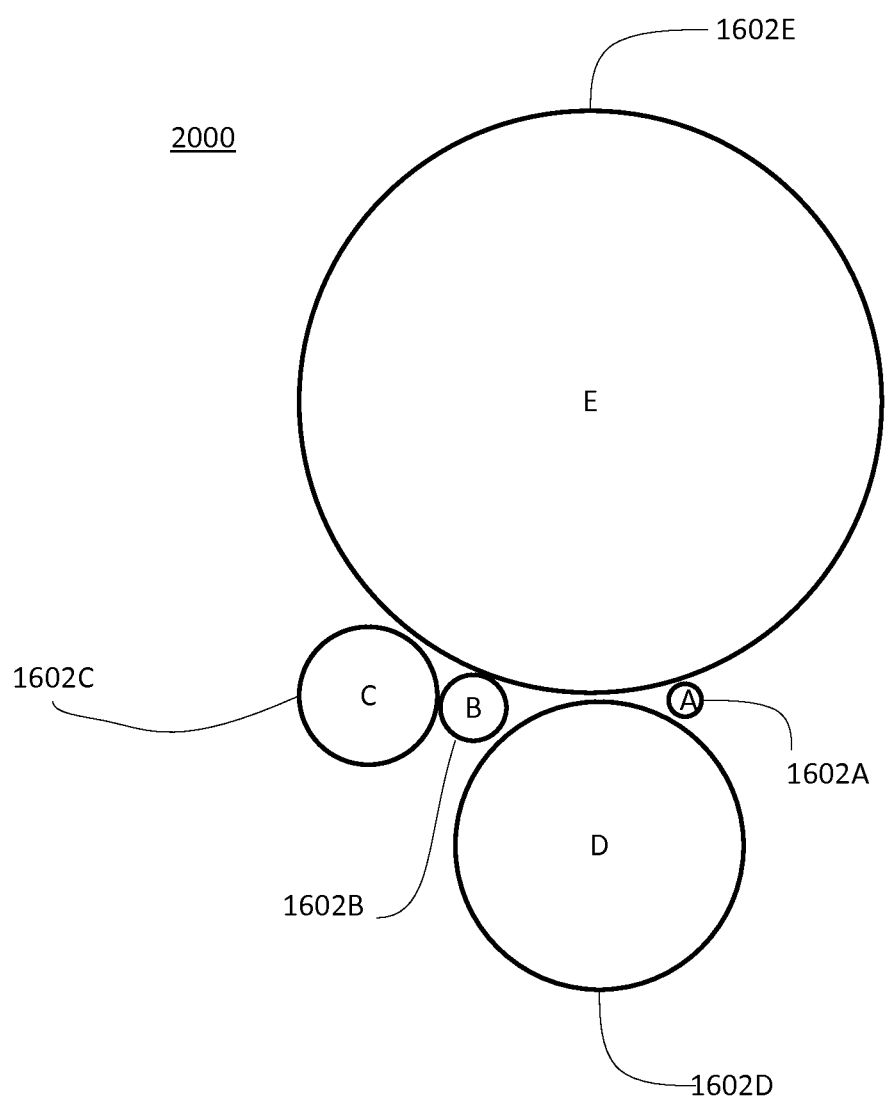
FIG. 20 illustrates a cylinder topography of a translational actuator in accordance with an embodiment.

FIG. 20 illustrates a cylinder topography 2000 of a translational actuator in accordance with an embodiment. In this example, it is assumed that diameters of the sub-cylinders follow the below relative unit amounts:

| CYLINDER | Units (e.g., cm, dm, etc.) |
|---|---|
| A (1602A) | 10 |
| B (1602B) | 20 |
| C (1602C) | 40 |
| D (1602D) | 80 |
| E (1602E) | 160 |

In the embodiment of FIG. 20, selector valve controller 1720 may take into account water speed at the module, measured by water flow meter 1722, to determine a power increment that matches the power absorption capability of the module to the manifold pressure. As such, selector valve controller 1720 may select one or more sub-cylinders or combinations of sub-cylinders 1602A-1602E in the assembly for connection to the high pressure manifold, e.g., according to the cylinder activation schedule below.

| Power Increment | Activated Cylinders |
|---|---|
| 1 | A |
| 2 | B |
| 3 | A + B |
| 4 | C |
| 5 | A + C |
| 6 | B + C |
| 7 | A + B + C |
| 8 | D |
| 9 | A + D |
| 10 | B + D |
| 11 | A + B + D |
| 12 | C + D |
| 13 | A + C + D |
| 14 | B + C + D |
| 15 | A + B + C + D |
| 16 | E |
| 17-30 | SIMILAR PATTERN |
| 31 | A + B + C + D + E |

Thus, by activating selected sub-cylinders 1602A-1602E or combinations of sub-cylinders in the assembly according to a determined power increment, all of the energy available to each module, at its location in the stream, is transmitted to the master accumulator at a uniform pressure. Note that the cross-sectional area of each sub-cylinder's interior will closely correspond to the piston drive surface area, i.e., the surface area of the piston that directly engages with fluid within a sub-cylinder. Thus, a higher sensed water speed in the vicinity of a module preferably results in controlling valves to activate (i.e., connect to the high pressure manifold) one or more sub-cylinders that correspond, collectively, to a greater total piston drive surface area and, by contrast, a slower sensed water speed in the vicinity of a module preferably results in controlling valve selections to active one or more sub-cylinders corresponding to a lower total piston drive surface area (with other sub-cylinders being de-activated).

While the present invention has been particularly described with respect to the illustrated embodiments, it will be appreciated that various alterations, modifications and adaptations may be made based on the present disclosure and are intended to be within the scope of the present invention. To cite but one example, in an alternative embodiment, fluid from the moving body of water in which the system is placed may provide the hydraulic fluid for the relevant hydraulic circuits. In such an embodiment, the various return conduits referenced herein may not be necessary.

While the invention has been described in connection with what are presently considered to be the most practical and preferred embodiments, it is to be understood that the present invention is not limited to the disclosed embodiment but, on the contrary, is intended to cover various modifications and equivalent arrangements included within the scope of the appended claims.

What is claimed is:

1. An apparatus for converting kinetic energy of a fluid stream into useful work by producing fluid pressure conveyable in a fluid conduit, the apparatus comprising a plurality of hydrofoil modules arranged in an array of hydrofoil modules, each hydrofoil module of the plurality of hydrofoil modules comprising:
    a plurality of balanced foils, a balanced foil comprising top and bottom semi-foils joined by a member;
    at least one translational transducer adapted to, in response to translational forces from the plurality of balanced foils, provide fluid pressure conveyable by a fluid conduit; wherein:
        the member joining a top semi-foil to a bottom semi-foil is mechanically linked to the at least one translational transducer for conveying translational force to the translational transducer; and
        the plurality of balanced foils and the at least one translational transducer are mounted within a module frame such that vertical axes of adjacent balanced foils are maintained parallel to each other and are limited to translational and rotational oscillatory movement within a translational range of motion and within a rotational range of motion;
    a module-specific fluidic power circuit fluidically coupled to the translational transducer to convey energy at a module-specific fluid pressure; and
    a module power decoupler unit coupled to the module-specific fluidic power circuit and to a high-pressure array-wide fluidic power circuit at an array-wide fluidic transmission pressure for transmission of fluid pressure to a fluidic accumulator, wherein the module power decoupler unit is adapted to convert energy at the module-specific fluid pressure to energy at the array-wide fluidic transmission pressure so that the translational transducer can provide fluid pressure through the fluid conduit to the array-wide fluidic power circuit at a substantially consistent array-wide pressure level despite variations in a speed of the fluid stream in the vicinity of the module.

2. The apparatus of claim 1 wherein each module frame is adapted for mounting within a cell of an array frame.

3. The apparatus of claim 2 wherein the module power decoupler unit comprises a pressure-control piston and valve assembly that is dynamically adjustable.

4. The apparatus of claim 3 wherein the pressure-control piston and valve assembly comprises:
    a plurality of sub-cylinders;
    a plurality of pistons mechanically coupled to the plurality of balanced foils such that translational forces from the balanced foils drive the plurality of pistons within the plurality of sub-cylinders; and
    a plurality of selectable valves selectively linking fluid pressure from respective ones of the sub-cylinders, depending on a valve selection, either to the array-wide fluidic power circuit through the fluid conduit or to a return pressure region.

5. The apparatus of claim 4 wherein the plurality of sub-cylinders are disposed within an enclosure and the return pressure region is within the enclosure.

6. The apparatus of claim 4 wherein a first piston of the plurality of pistons has a different drive surface area than a second piston of the plurality of pistons.

7. The apparatus of claim 3 wherein a hydrofoil module is coupled to a water speed sensor to determine a water speed in the vicinity of the hydrofoil module, the water speed sensor being coupled to provide input to a valve controller for controlling selection of the plurality of selectable valves based upon a sensed water speed, a faster sensed water speed generally resulting in selection of one or more valves linking pistons corresponding to a greater total piston drive surface area to the array-wide fluidic power circuit and a slower sensed water speed generally resulting in selection of one or more valves linking pistons corresponding to a lesser total piston drive surface area to the array-wide fluidic power circuit.

8. An apparatus for converting kinetic energy of a fluid stream into useful work by producing fluid pressure conveyable in a fluid conduit, the apparatus comprising a plurality of hydrofoil modules arranged in an array of hydrofoil modules, each hydrofoil module of the plurality of hydrofoil modules comprising:
    a plurality of hydrofoils; and
    at least one translational transducer adapted to, in response to translational forces from the plurality of hydrofoils, provide fluid pressure conveyable by a fluid conduit; wherein:
    a hydrofoil of the plurality of hydrofoils is mechanically linked to the at least one translational transducer for conveying translational force to the translational transducer;
    the plurality of hydrofoils and the at least one translational transducer are mounted within a module frame such that vertical axes of adjacent hydrofoils are maintained parallel to each other and are limited to translational and rotational oscillatory movement within a translational range of motion and within a rotational range of motion; and
    the module frame is adapted for mounting within a cell of an array frame, such that a plurality of hydrofoil modules so mounted provide the array of hydrofoil modules;
    wherein the module frame and the array frame comprise corresponding module and array portions of an interface unit, the interface unit being adapted to connect a module high pressure conduit to an array high pressure conduit such that, when the module frame is removed from the array frame, the array high pressure conduit is sealed at the corresponding array portion of the interface unit and, when the module frame is inserted into the array frame, the interface unit is adapted to provide a fluid connection between the module high pressure conduit and the array high pressure conduit.

9. The apparatus of claim 8 wherein the translational transducer comprises a pressure-control piston and valve assembly that is dynamically adjustable so that the translational transducer can provide fluid pressure through the fluid conduit to an array-wide fluid pressure circuit at an array-wide pressure level despite variations in a speed of the fluid stream in the vicinity of the hydrofoil module.

10. The apparatus of claim 9 wherein the pressure-control piston and valve assembly comprises:
    a plurality of sub-cylinders;
    a plurality of pistons mechanically coupled to the plurality of hydrofoils such that translational forces from the hydrofoils drive the plurality of pistons within the plurality of sub-cylinders; and a plurality of selectable valves selectively linking fluid pressure from respective ones of the sub-cylinders, depending on a valve selection, either to the array-wide fluid pressure circuit through the fluid conduit or to a return pressure region.

11. The apparatus of claim 10 wherein the plurality of sub-cylinders are disposed within an enclosure and the return pressure region is within the enclosure.

12. The apparatus of claim 9 wherein a hydrofoil module is coupled to a water speed sensor to determine a water speed in the vicinity of the hydrofoil module, the water speed sensor being coupled to provide input to a valve controller for controlling selection of the plurality of selectable valves based upon a sensed water speed, a faster sensed water speed generally resulting in selection of one or more valves linking pistons corresponding to a greater total piston drive surface area to the array-wide fluid pressure circuit and a slower sensed water speed generally resulting in selection of one or more valves linking pistons corresponding to a lesser total piston drive surface area to the array-wide fluid pressure circuit.

13. The apparatus of claim 9 wherein a first piston of the plurality of pistons has a different drive surface area than a second piston of the plurality of pistons.

14. The apparatus of claim 8 wherein each hydrofoil module comprises:
a module-specific fluidic power circuit fluidically coupled to the translational transducer to convey energy at a module-specific fluid pressure; and
a module power decoupler unit coupled to the module-specific fluidic power circuit and to a high-pressure array-wide fluidic power circuit at an array-wide fluid transmission pressure for transmission to a fluidic accumulator, wherein the module power decoupler unit is adapted to convert energy at the module-specific fluid pressure to energy at the array wide fluid transmission pressure.

15. The apparatus of claim 8 wherein the interface unit comprises:
a transfer core moveable within a transfer sleeve, the transfer core comprising a transfer conduit channel, the transfer sleeve being moveable within a cylindrical bore of the interface unit;
wherein:
the cylindrical bore of the interface unit comprises an injector bore portion and a receptor bore portion, the injector bore portion including an injector opening to the array high pressure conduit and the receptor bore portion including a receptor opening to the module high pressure conduit;
the transfer sleeve comprises first and second transfer openings; and
the transfer core, the transfer conduit channel, the transfer sleeve, the injector opening, the receptor opening, the first transfer opening and the second transfer opening are arranged relative to each other such that when the module frame is inserted into the array frame, pressure applied to the transfer core moves the transfer core within the transfer sleeve and moves the transfer sleeve within the cylindrical bore until the first and second transfer openings are respectively aligned with the injector and receptor openings such that high pressure fluid can flow between the array high pressure conduit and the module high pressure conduit through the transfer conduit channel.

16. The apparatus of claim 15 further comprising:
an injector compression spring abutting the transfer core at one end; and
a receptor compression spring abutting a receptor wall at one end and positioned to receive pressure transferred through the injector compression spring at another end.

17. The apparatus of claim 16 wherein the receptor compression spring has a lower spring rate than the injector compression spring.

18. The apparatus of claim 8 wherein the interface unit comprises a plurality of transfer conduit channels and is adapted to connect a plurality of respective module conduits to a plurality of respective array conduits.

* * * * *